(12) United States Patent
Kempeneers et al.

(10) Patent No.: US 10,707,663 B2
(45) Date of Patent: Jul. 7, 2020

(54) CABLE GROUNDING ASSEMBLY FOR TELECOMMUNICATIONS ENCLOSURE

(71) Applicant: CommScope Connectivity Belgium BVBA, Kessel-Lo (BE)

(72) Inventors: Dirk Kempeneers, Aarschot (BE);
William J. Curry, Angier, NC (US);
Mark A. Harvell, Lillington, NC (US);
Philippe Coenegracht, Hasselt (BE);
Peterson V. Moreira, Wilsele (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 19 days.

(21) Appl. No.: 15/914,340

(22) Filed: Mar. 7, 2018

(65) Prior Publication Data
US 2018/0261986 A1 Sep. 13, 2018

Related U.S. Application Data

(60) Provisional application No. 62/468,159, filed on Mar. 7, 2017.

(51) Int. Cl.
*H02G 3/08* (2006.01)
*H01R 4/38* (2006.01)
*G02B 6/44* (2006.01)
*H01R 4/60* (2006.01)

(52) U.S. Cl.
CPC .............. *H02G 3/083* (2013.01); *G02B 6/443* (2013.01); *G02B 6/4446* (2013.01); *H01R 4/38* (2013.01); *H01R 4/60* (2013.01)

(58) Field of Classification Search
CPC .............. H02G 3/083; H01R 4/38; H01R 4/60
See application file for complete search history.

(56) References Cited

U.S. PATENT DOCUMENTS

| 5,241,135 A * | 8/1993 | Fetzer | H01R 9/0512 174/88 R |
| 6,340,250 B1 * | 1/2002 | Auclair | G02B 6/4477 385/87 |
| 7,492,996 B2 | 2/2009 | Kowalczyk et al. | |
| 7,883,382 B2 * | 2/2011 | Howard | H01R 11/07 439/810 |
| 8,023,793 B2 | 9/2011 | Kowalczyk et al. | |
| 9,502,878 B2 | 11/2016 | Coenegracht et al. | |
| 9,685,776 B2 | 6/2017 | Coenegracht et al. | |
| 9,791,653 B2 | 10/2017 | Aznag et al. | |
| 2010/0285678 A1 * | 11/2010 | Mech | H01R 4/38 439/101 |
| 2015/0093090 A1 | 4/2015 | Aznag et al. | |
| 2015/0137461 A1 | 5/2015 | Coenegracht et al. | |
| 2017/0033544 A1 | 2/2017 | Coenegracht et al. | |
| 2018/0039037 A1 | 2/2018 | Aznag et al. | |

FOREIGN PATENT DOCUMENTS

WO 2017/114935 A1 7/2017

* cited by examiner

*Primary Examiner* — Dimary S Lopez Cruz
(74) *Attorney, Agent, or Firm* — Merchant & Gould P.C.

(57) ABSTRACT

Grounding assemblies for cables entering telecommunications enclosures. The grounding assemblies include a cable fixation subassembly and a grounding subassembly that are electrically coupled together to ground strength members and a conductive shield of a cable. The cable fixation subassembly can fixate the cable such that the strength members lie in a plane that is at a non-zero angle relative to each of a horizontal reference plane and a vertical reference plane.

18 Claims, 26 Drawing Sheets

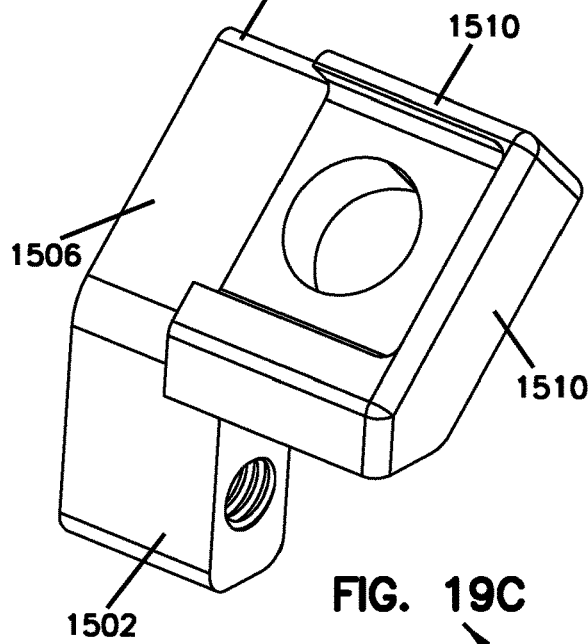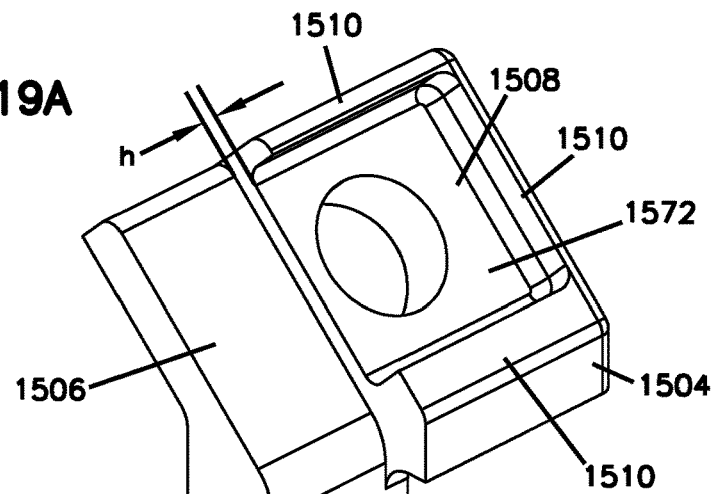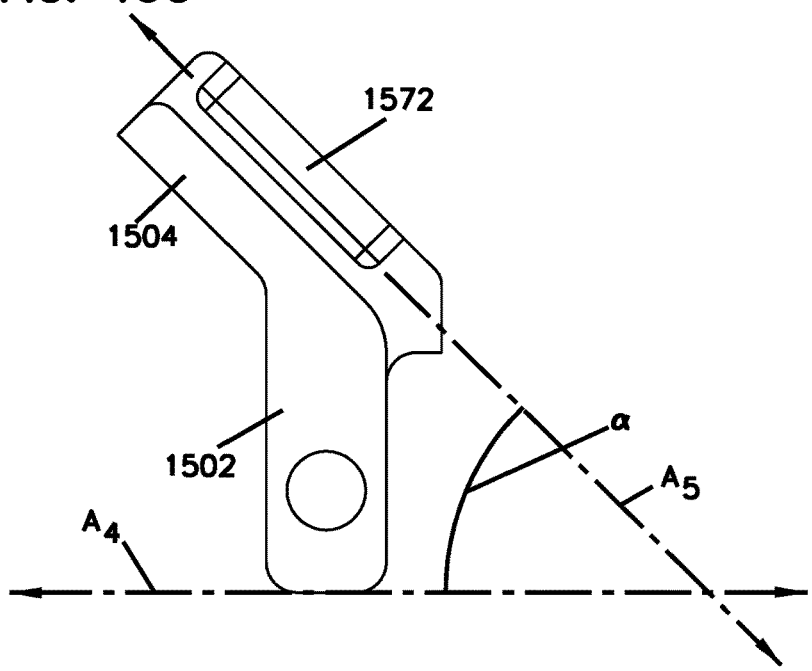

CABLE GROUNDING ASSEMBLY FOR TELECOMMUNICATIONS ENCLOSURE

CROSS REFERENCE TO RELATED APPLICATION

This application claims the benefit of provisional application Ser. No. 62/468,159, filed Mar. 7, 2017, which is incorporated herein by reference in its entirety.

TECHNICAL FIELD

The present disclosure relates to telecommunications enclosures, and more particularly to cable grounding assemblies used in telecommunications enclosures for fiber optic cables.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, and wave division multiplexers.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures.

In certain applications, the enclosure/housing needs to be water and contaminant (e.g., dust) proof or water-resistant. In particular, water, moisture, cleaning fluids, dust etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. One or more sealing blocks (e.g., gel blocks) housed in one of the housing pieces can be compressed against corresponding sealing blocks in another housing piece to form a seal therebetween. To accommodate cables or other components (e.g., grounding studs) entering the enclosure through ports in the enclosure wall, corresponding sealing blocks positioned at the port locations of the enclosure can include sealing blocks with cutouts therein such that the sealing blocks can be compressed around the cable or grounding stud forming a seal.

By swapping out the sealing blocks at the cable ports, the enclosure can be customized according to varying numbers and sizes of cables entering the enclosure while still providing an internal environment sealed off from the outside. For example, sealing blocks with cutouts of a first diameter can be swapped for sealing blocks with cutouts of a second diameter to accommodate a different diameter cable. In addition, varying the degree of compression of the sealing blocks about a cable or grounding stud can allow for selectively sealing different diameter cables or studs. In addition, cable ports not in use can be closed off by swapping sealing blocks having cable cutouts for sealing blocks that do not have cutouts.

Typically, cables entering telecommunications enclosures must be fixed in place inside the enclosure. Cable clamps attached to the interior of the enclosure can be used for this purpose. In addition, as alluded to above, there is a need to electrically ground certain telecommunications enclosures. The electrical grounding may be used to dissipate static electricity, provide a return path for electrical power, provide a safety ground in case of equipment malfunction, etc. Certain enclosure housings are made of nonconductive material (e.g., plastic, fiber glass, etc.). As the enclosure/housing may not readily conduct electricity, a grounding stud may be passed through a wall of the housing/enclosure and thereby provide a grounding point on an exterior and interior of the enclosure/housing. The grounding stud may include threaded connections for attaching terminals to the grounding stud at the interior and/or the exterior of the enclosure/housing. To facilitate installing and/or removing the terminals from the threaded connections, the grounding stud may be rotationally connected to the enclosure/housing.

Specific grounding requirements for enclosures such as telecommunications enclosures can vary among geographic regions depending on applicable laws and regulations. In addition, for an enclosure of a given volume, it is generally desirable to maximize that volume for data transmission, e.g., by maximizing the number and size of the cables distributed by the enclosure. Thus, efficient use of the space for cable fixation and cable grounding within a telecommunications enclosure is desirable.

SUMMARY

In certain aspects, the present disclosure relates to a cable grounding assembly for a telecommunications enclosure, and also to a system of such cable grounding assemblies and their respective cables.

In a typical telecommunications distribution cable (e.g., a central core cable), one or more optical fibers that transmit optical signals are disposed along or parallel to the central longitudinal axis of the cable. Typically, the fibers will be coated and cladded for protection. The optical fibers can in some examples be surrounded and protected by a nonconductive inner tube coaxial with the cable, the inner tube housing the optical fibers. Surrounding the inner tube is a tubular conductive shield also coaxial with the cable. In some cases the conductive shield has a corrugated structure. An exterior tubular insulating jacket also coaxial with the cable surrounds the conductive shield.

Some distribution cables (particularly those of relatively large diameter) also include one or more axial strength members running parallel to the cable's central axis. A typical strength member is a metallic (i.e., conductive) rod running parallel to the cable axis interior to the outer jacket. In a typical cable configuration, there are two such strength members approximately 180° apart. Distribution cables can be heavy, and the strength members increase the stability and rigidity of the cable.

In certain aspects, the present disclosure relates to a grounding assembly for a cable, the cable having a central axis, at least one optical fiber, a conductive shield coaxial with the central axis, and at least one strength member parallel to the central axis, the grounding assembly comprising a cable fixation unit, a strength member grounding unit, a first grounding conductor, and a second grounding conductor, the cable fixation unit having a first cavity and a second cavity, the first cavity removably receiving and securing opposing ends of a cable strap, the second cavity removably receiving and securing a mounting portion of the strength member grounding unit, the strength member grounding unit having at least one passage for receiving the at least one strength member, the first grounding conductor having a first portion electrically couplable to the conductive shield and a second portion electrically couplable to a grounding bar, the second grounding conductor having a first portion electrically couplable to the strength member grounding unit and a second end electrically couplable to the grounding bar.

In further aspects, the present disclosure relates to a grounding assembly for a cable, the cable having a central axis, at least one optical fiber, and two strength members each having a longitudinal axis parallel to the central axis of the cable and on opposing sides of the cable, the grounding assembly comprising a cable fixation unit comprising a cavity and a mounting surface configured for mounting the cable fixation unit to a telecommunications enclosure, the mounting surface defining a first plane, the grounding assembly further comprising a strength member grounding unit, the strength member grounding unit comprising a mounting portion removably received by the cavity and a grounding portion integral with the mounting portion and having at least one passage for receiving the strength members, the at least one passage defining a second plane, wherein when the mounting portion of the strength member grounding unit is received by the cavity, the first plane and the second plane are oblique to each other.

In further aspects, the present disclosure relates to a grounding assembly for a cable, the cable having a central axis, at least one optical fiber, a conductive shield coaxial with the central axis, and at least one strength member parallel to the central axis, the grounding assembly comprising a cable fixation unit, a strength member grounding unit, a first grounding conductor, and a second grounding conductor, the cable fixation unit having a first cavity and a second cavity, the first cavity removably receiving and securing opposing ends of a cable strap, the second cavity removably receiving and securing a mounting portion of the strength member grounding unit, the strength member grounding unit having at least one passage for receiving the at least one strength member, the first grounding conductor having a first portion electrically couplable to the conductive shield, the first portion being biased towards the conductive shield by a spring element, and a second portion electrically couplable to a grounding bar, the second grounding conductor having a first portion electrically couplable to the cable fixation unit and a second end electrically couplable to the grounding bar.

In further aspects the present disclosure relates to a system for grounding at least one fiber optic cable, the fiber optic cable having a central axis, at least one optical fiber, and two strength members each having a longitudinal axis parallel to the central axis of the cable and on opposing sides of the cable, the system comprising an enclosure, a cable fixation unit comprising a mounting surface, the mounting surface defining a first plane and being mounted to the enclosure, the cable fixation unit comprising a first cavity and a second cavity, the first cavity securing opposing ends of a cable strap, the second cavity securing a mounting portion of a strength member grounding unit, the strength member grounding unit further comprising a grounding portion integral with the mounting portion and having a pair of passages for receiving the strength members, each of the passages defining a central axis, the central axes of the passages defining a second plane, the system further comprising a first grounding conductor having a first portion electrically connected to a conductive shield of the cable and a second portion electrically connected to a grounding bar, the grounding bar being partially disposed within the enclosure, the system further comprising a second grounding conductor having a first portion electrically connected to the strength member grounding unit and a second portion electrically connected to the grounding bar, wherein when the mounting portion of the strength member grounding unit is received by the second cavity, the first plane and the second plane are oblique to each other.

In still further aspects the present disclosure relates to a method of grounding at least one fiber optic cable, the fiber optic cable having a central axis, at least one optical fiber, a conductive shield coaxial with the central axis, an insulating jacket surrounding the conductive shield, and two strength members each having a longitudinal axis parallel to the central axis of the fiber optic cable and on opposing sides of the fiber optic cable, the method including: removing a portion of the insulating jacket to expose the conductive shield; coupling an end of each of the strength members to a strength member grounding unit; securing an electrical contact between the strength member grounding unit and the strength members; affixing a first end of a first grounding conductor to the strength member grounding unit; coupling a portion of the strength member grounding unit to a cable fixation unit; affixing a first end of a second grounding conductor to the conductive shield; and securing the first end of the second grounding conductor and fiber optic cable to the cable fixation unit.

In some examples, the method further includes affixing a second end of each of the grounding conductors to a grounding bar. In some examples, the conductive shield comprises a protective outer coating, the fiber optic cable is secured to the cable fixation unit with a strap, and the method includes sandwiching a toothed element between a surface of the strap and the conductive shield to pierce the protective outer coating. In some examples, the fiber optic cable is secured to the cable fixation unit with a strap, and the method includes inserting a biasing mechanism between a surface of the strap and the conductive shield. In some examples, the method further includes locking the portion of the strength member in a recess of the cable fixation unit. In some examples, the method further includes mounting a mounting surface of the cable fixation unit to an interior wall of a telecommunications enclosure, wherein the mounting surface defines a first plane, wherein the strength members define a second plane, and wherein the first plane and the second plane are oblique to each other.

In still further aspects, the present disclosure relates to a kit that can be used for grounding at least one fiber optic cable, the fiber optic cable having a central axis, at least one optical fiber, and at least one strength member having a longitudinal axis parallel to the central axis of the cable, the kit comprising: at least one cable fixation unit comprising a first cavity and a second cavity; and/or at least one cable strap having opposing ends securable in the first cavity; and/or a strength member grounding unit having a mounting portion securable in the second cavity and a grounding portion integral with the mounting portion and defining at least one passage for receiving the at least one strength member, the at last one passage defining a first plane and a bottom surface of the mounting portion defining a second plane that is oblique to the first plane; and/or a first grounding conductor having a first portion electrically connectable to a conductive shield of the cable; and/or a grounding bar electrically connectable to a second portion of the first grounding conductor; and/or a second grounding conductor having a first portion electrically connectable to the strength member grounding unit and a second portion electrically connectable to the grounding bar; and/or a biasing element for biasing the first grounding conductor towards the conductive shield; and/or a strap block for holding ends of the cable strap within a cable fixation unit; and/or a toothed element for sandwiching between the first grounding conductor and the conductive shield; and/or fasteners for securing the grounding conductors to one or more of the cable fixation unit, the strength member grounding unit, and the grounding bar; and/or a cable jacket stripping tool; and/or a strength member cutting tool; and/or a fastener fastening tool; and/or one or more trays having one or more panels for housing the cable fixation unit and the strength member grounding unit, and/or the grounding bar.

In some examples of the aforementioned kit, with respect to the strength member grounding unit, in some examples the at least one passage is partially defined by a cover that covers some or all of the grounding portion. In some examples, the cover includes one or more extensions that at least partially define entrances to the at least one passage. In some examples, the grounding portion includes a strength member terminating area and a grounding conductor platform, the grounding conductor platform being stepped down from the strength member terminating area. In some examples, the cover includes an underside for contacting a grounding conductor and an interiorly threaded boss for receiving a fastener in between the strength members in the strength member terminating area. In some examples, the strength member terminating area includes one or more walls defining a recess in which the ends of the strength members are secured.

In some examples of the aforementioned kit, the kit further includes a cable fixation unit mounting block that can be received in a third cavity of the cable fixation unit.

In some examples of the aforementioned kit, the kit further includes one or more insulating sleeves that can be sleeved around the grounding conductors.

In some examples of the aforementioned kit, the grounding bar includes a grounding stud and a mounting portion. In some examples, the mounting portion includes a top opening slot or a side opening slot for receiving the grounding conductors and/or one or more fastener holes for fastening the grounding conductors to the mounting portion within the slot in an electrically conductive manner.

In some examples, a system and method is provided for grounding at least one fiber optic cable, the fiber optic cable having a central axis, at least one optical fiber, and a conductive member, the system and method comprising: an enclosure including a plurality of ports for sealing cables entering the enclosure; a grounding bar positionable in one of the ports; a cable fixation unit attachable to a cable extending through another of the ports; and an electrical connection extendable from the ground bar to the conductive member of the cable. In some examples, more than one cable is provided, each in its own port. In some examples, more than one grounding bar is provided, each in its own port.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 19A is an isometric view of a portion of an example strength member grounding unit that can be used in the cable subassembly of FIG. 17.

FIG. 19B is a further isometric view of the portion of the example strength member grounding unit of FIG. 19A.

FIG. 19C is a front view of the portion of the strength member grounding unit of FIG. 19A.

DETAILED DESCRIPTION

Figure 1A:
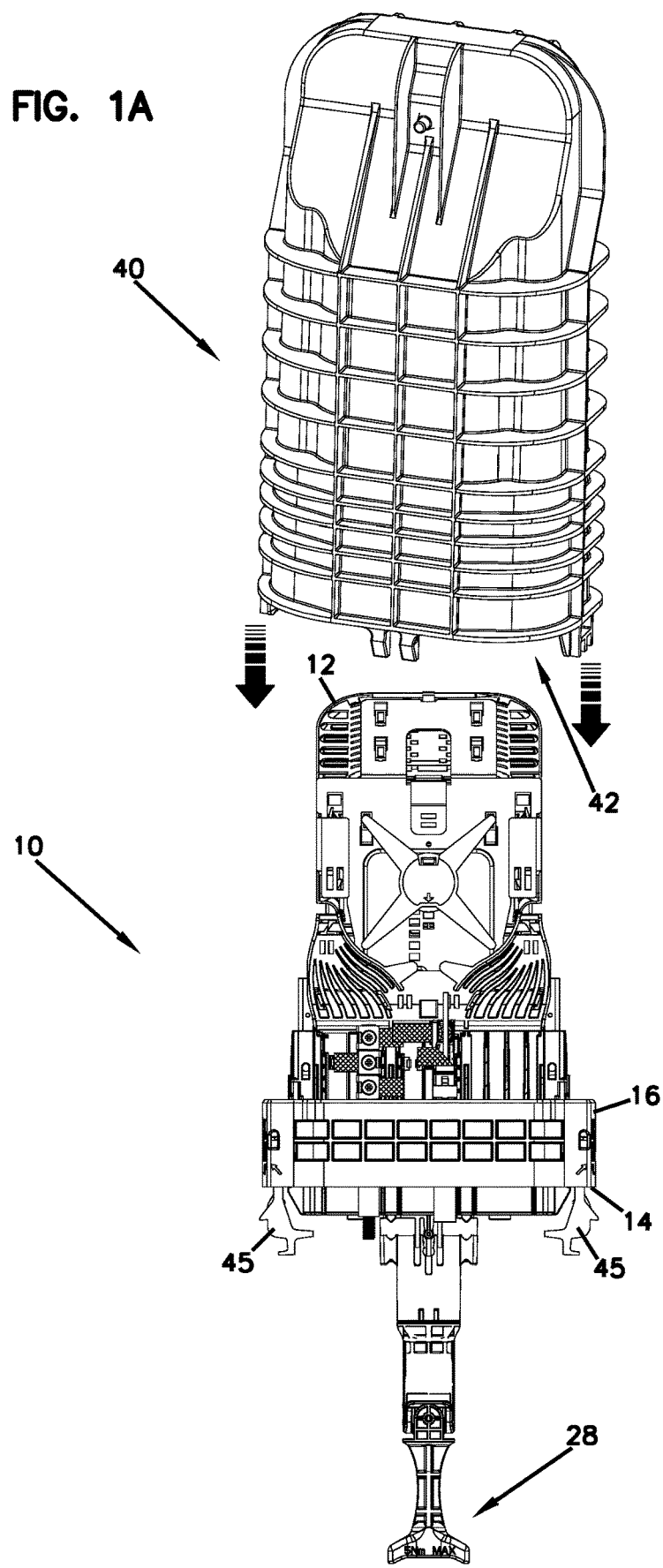
FIG. 1A is a view of an example telecommunications assembly including an example cable grounding assembly in accordance with the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 1B:
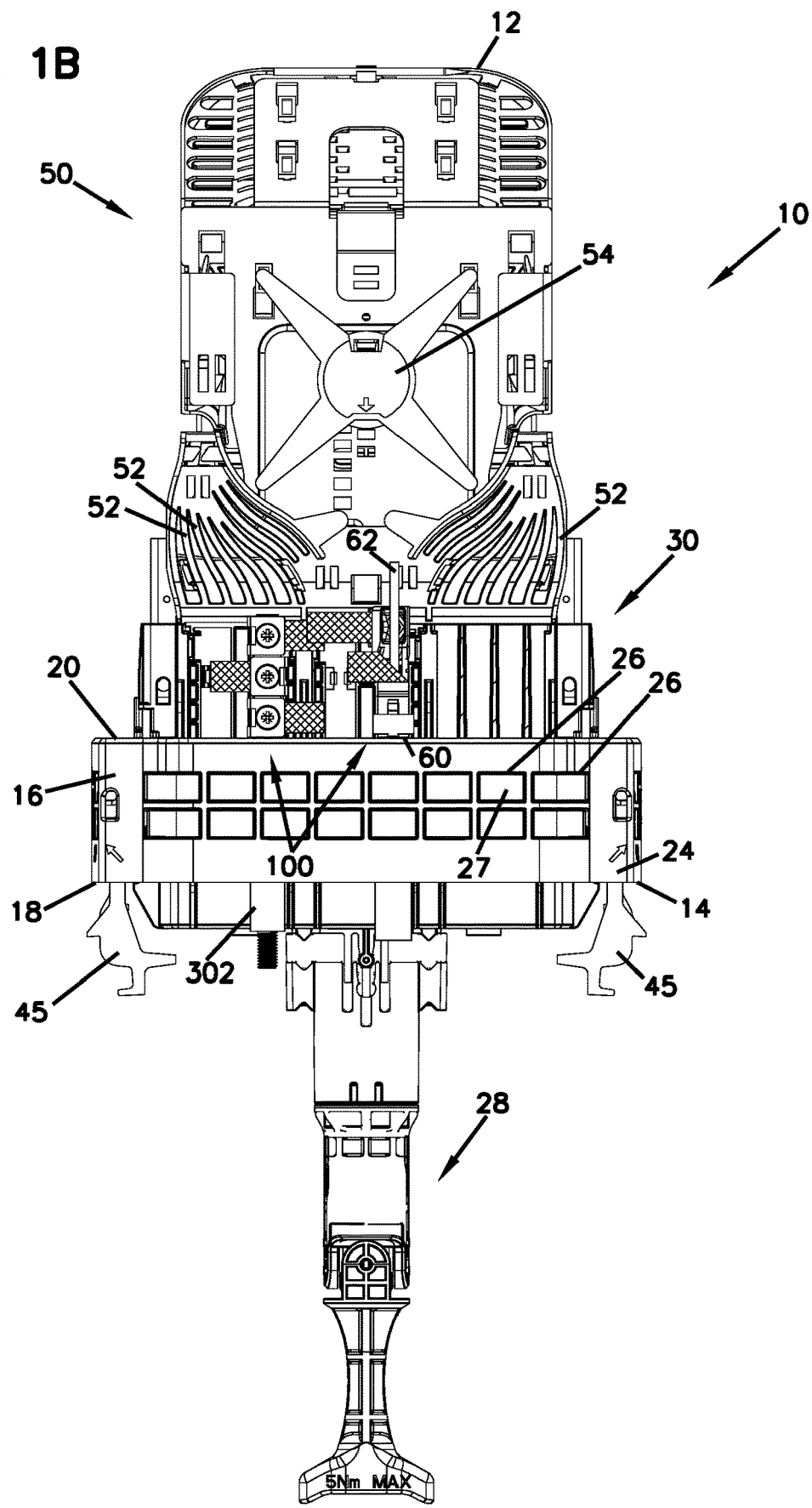
FIG. 1B is a top view of a portion of the telecommunications assembly of FIG. 1A.
Figure 2:
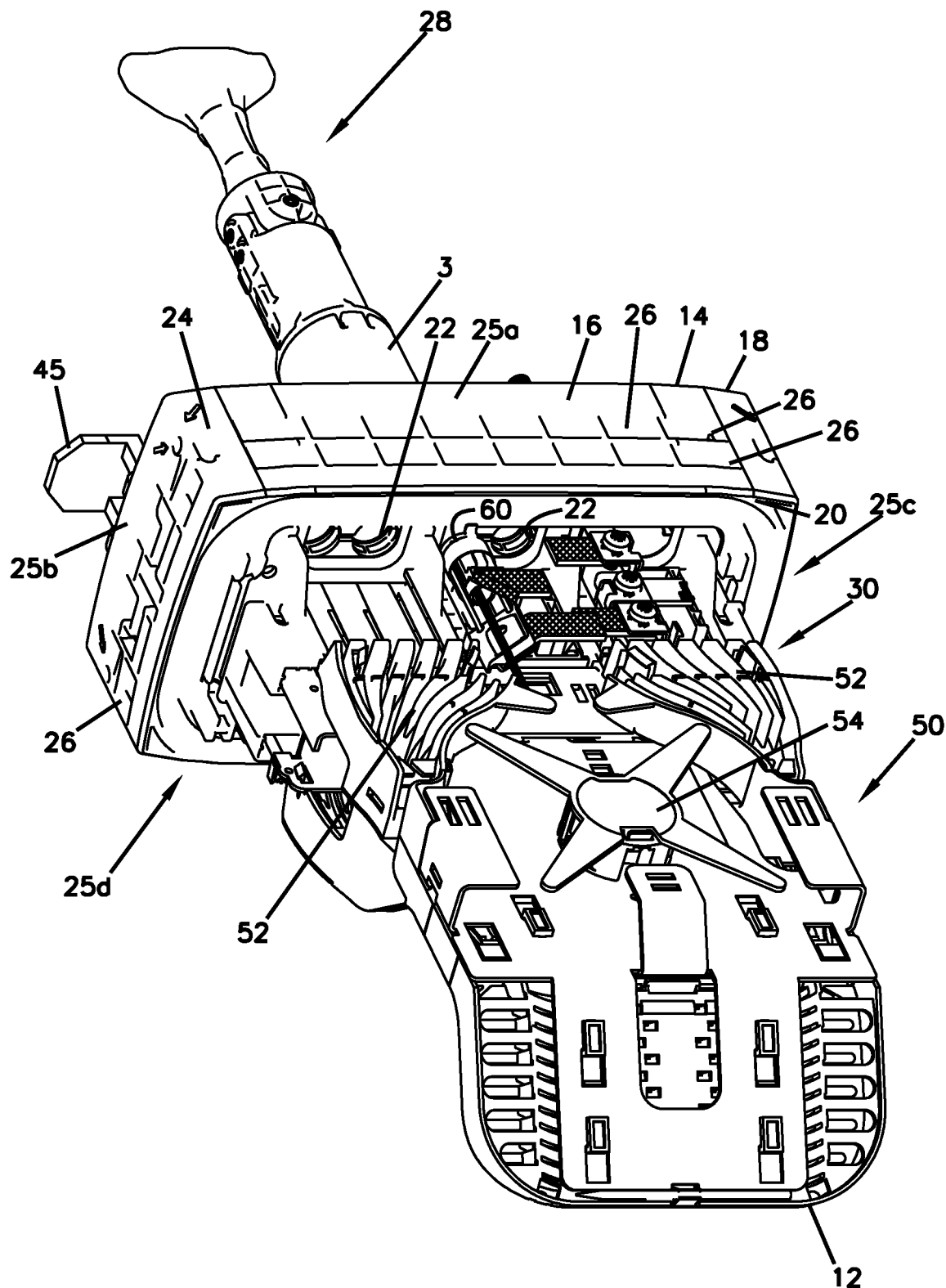
FIG. 2 is an isometric view of a portion of the telecommunications assembly of FIG. 1A.

FIG. 1A is a view of an example telecommunications assembly including an example cable grounding assembly in accordance with the present disclosure. FIG. 1B shows a top view of a portion of the telecommunications assembly of FIG. 1A having an insert 10 and including an example cable grounding assembly 100 in accordance with the present disclosure. FIGS. 1A and 1B will be referred to herein collectively as FIG. 1. FIG. 2 is an isometric view of the telecommunications assembly of FIG. 1.

Referring to FIG. 1, the insert 10 generally includes a front 12 and a back 14. A partition 16 separates the components (forward of the partition) to be protected within an enclosure housing 40 (shown separated from the insert 10 in FIG. 1A) from the components (rearward of the partition) that will remain outside the enclosure housing 40. The partition 16 itself is configured to close off and seal an open side 42 of the enclosure housing 40. One or more closable and sealable ports 22 extend through the partition 16 from the back 18 to the front 20 of the partition 16. The ports 22 enable communication between the interior of the enclosure and an outside environment. The ports 22 can be selectively sized and/or closed off completely depending on how the enclosure is to be used. For example, one or more of the ports can be left open to receive fiber optic cables, or a grounding bar, as described below. Dummy plugs can be used to fill open ports to enable sealing of the ports if cables or ground bars are to be added later.

Ports 22 that are left open for this purpose can be configured to form a seal around the cable or grounding bar passing through the port. Once the insert 10 has been inserted in the enclosure housing 40, an actuator 28 can be activated, e.g., by applying torque to the actuator 28. The actuator 28 causes sealing blocks disposed in the ports 22 to compress and seal against the outside of the cable or other component passing through the port.

The partition 16 includes a wall 24. In this example, the wall 24 has four sides 25a, 25b, 25c, and 25d (collectively, the sides 25), which are configured to be received within a correspondingly walled opening of the enclosure. On each of the sides 25 are a plurality of recesses 26. In some examples, one or more of the recesses 26 includes a sealing block constructed of, e.g., a foam or gel material. Such sealing blocks can be used to seal off cables or other components in the ports 22 by activating the actuator 28 as described above.

The portion of the insert 10 destined to be housed within the enclosure includes a cable mounting area 30 and a fiber routing or fiber organizing area 50. The partition 16 can include one or more latches 45 designed to lockingly engage complementary features of the enclosure housing 40 to reinforce a secure engagement between the insert 10 and the housing 40.

Cables mounted in the cable mounting area 30 can include pre-routed cables and post-routed cables. For example, a pre-routed input cable can be mounted in a first position in the cable mounting area 30. One or more optical fibers from the input cable can be split and/or routed in the routing/organizing area 50 and/or spliced to an output cable mounted in a second position in the cable mounting area 30. For example, the fibers can be routed through various organizing channels 52 within the routing/organizing area 50, and excess fiber slack can be stored at storage structures, such as the storage structure 54. The cable mounting area 30 can also include mounting positions for other components such as grounding bars (or studs of grounding bars) for grounding the cables. The grounding bars will be discussed in greater detail below.

In the example insert 10 as shown, a ruggedized cable 60 passes through the partition 16 from a rear of the partition 16. Inside the enclosure, the cable 60 is secured to the insert 10 and also grounded via the cable grounding assembly 100, as discussed in detail below. The cable grounding assembly 100 is mounted in the cable mounting area 30. An axial strip 63 of the jacket 69 of the cable 60 is removed and one or more optical fibers 62 enter the fiber routing/fiber organizing area 50, where the fibers 62 can be sorted, routed, split, spliced, stored, organized, and so forth. The fibers 62 carried by the cable 60 can be in a variety of configurations, such as loose fibers, ribbon fibers, etc.

In the example insert 10 as shown, a portion of a grounding bar 302 passes through the partition 16 via one of the ports 22. The grounding bar 302 is part of the cable grounding assembly 100, and will be discussed in greater detail below.

Figure 3:
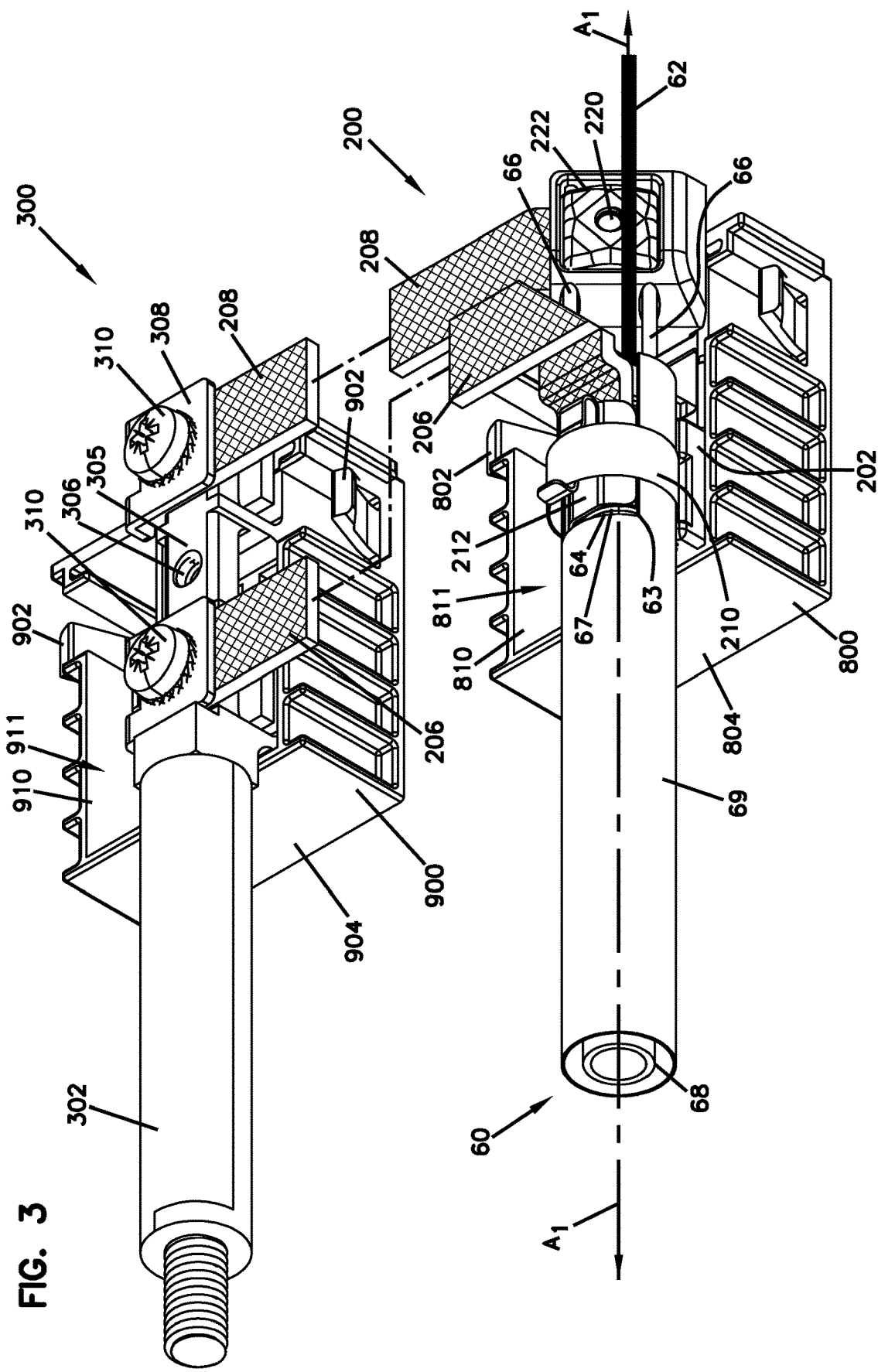
FIG. 3 is an isometric view of the cable grounding assembly of FIG. 1A, including a portion of the cable of FIG. 1A.
Figure 4:
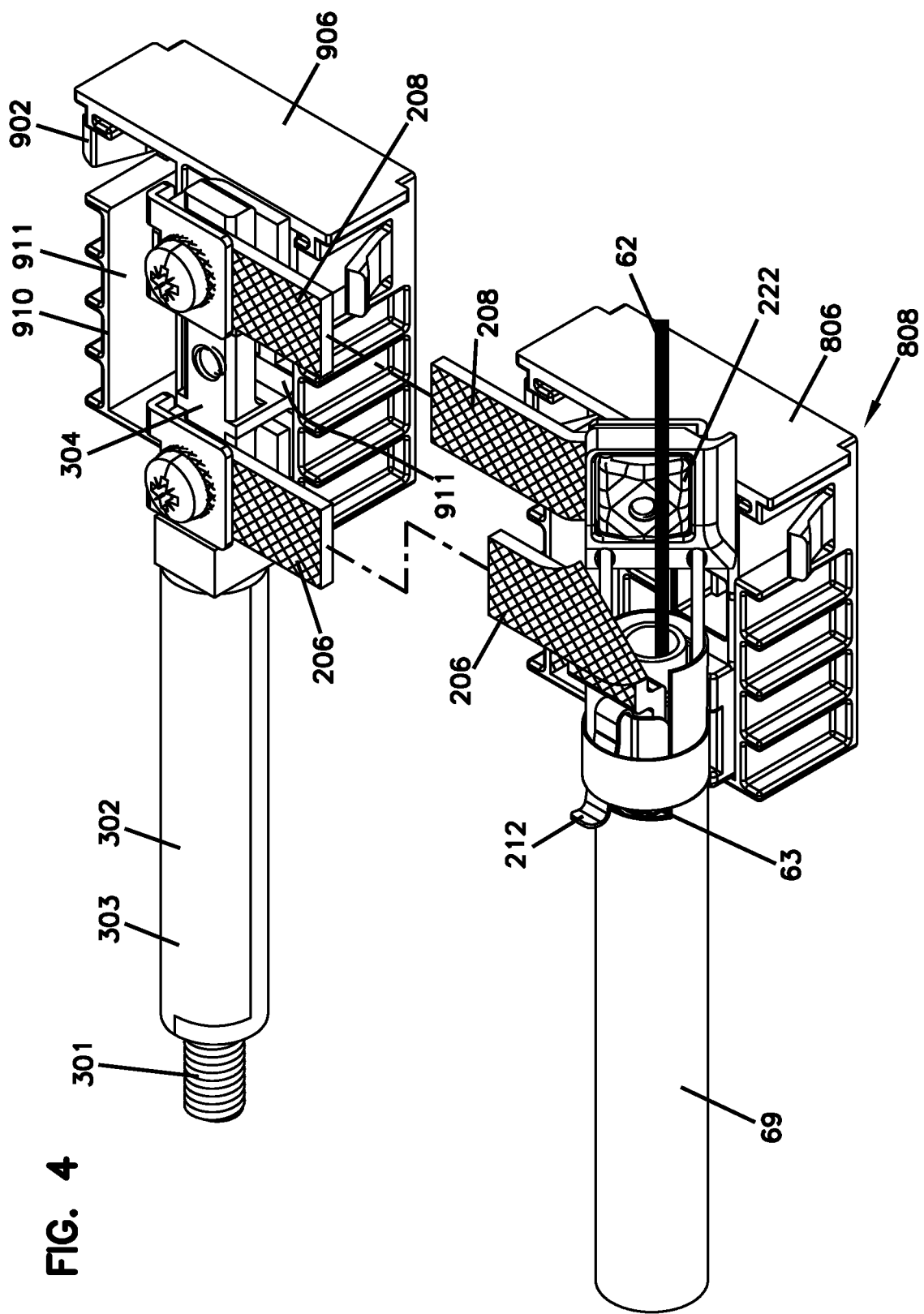
FIG. 4 is a further isometric view of the cable grounding assembly of FIG. 1A, including a portion of the cable of FIG. 1A.
Figure 5:
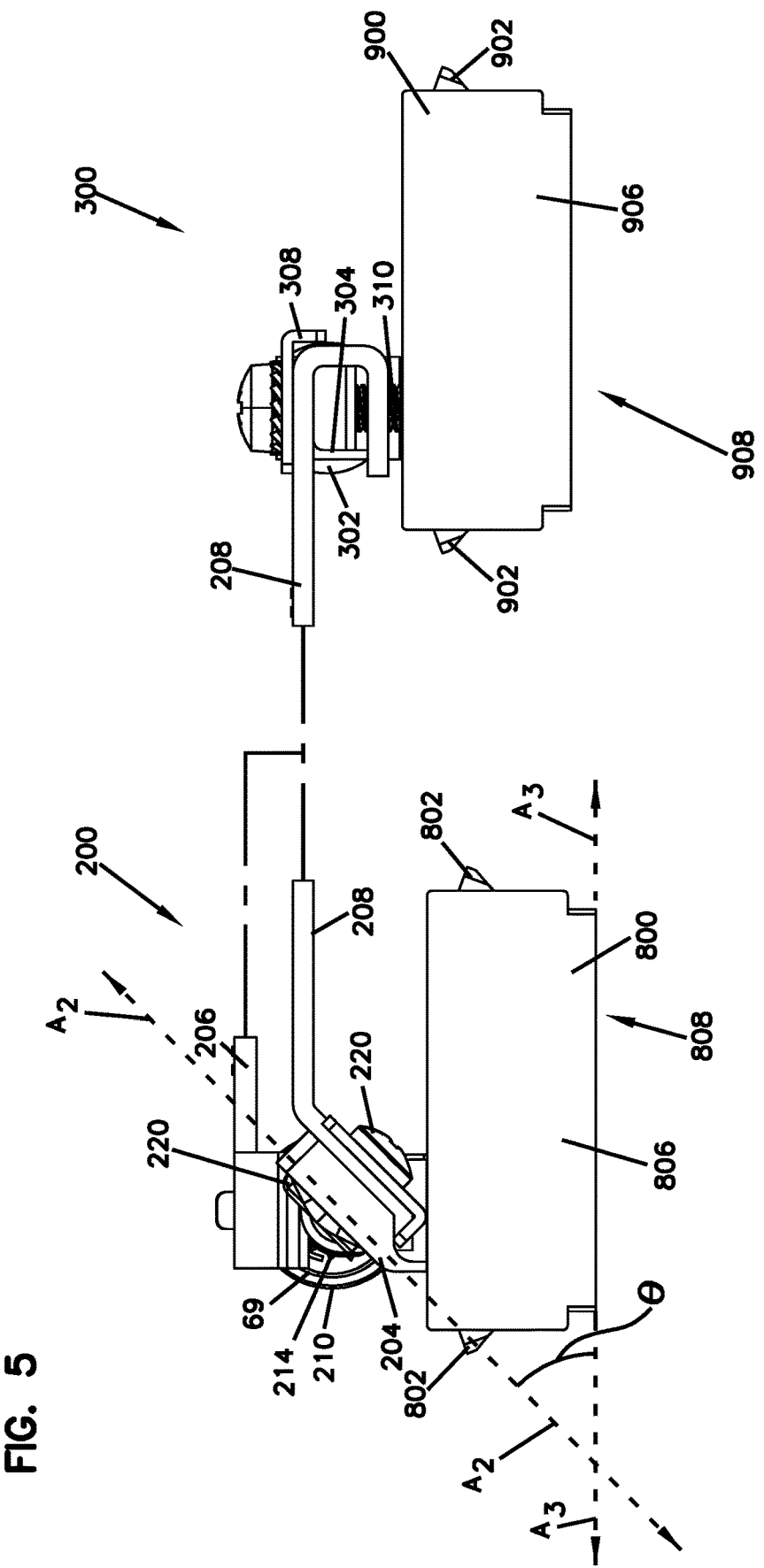
FIG. 5 is a front view of the cable grounding assembly of FIG. 1A, including a portion of the cable of FIG. 1A.
Figure 6:
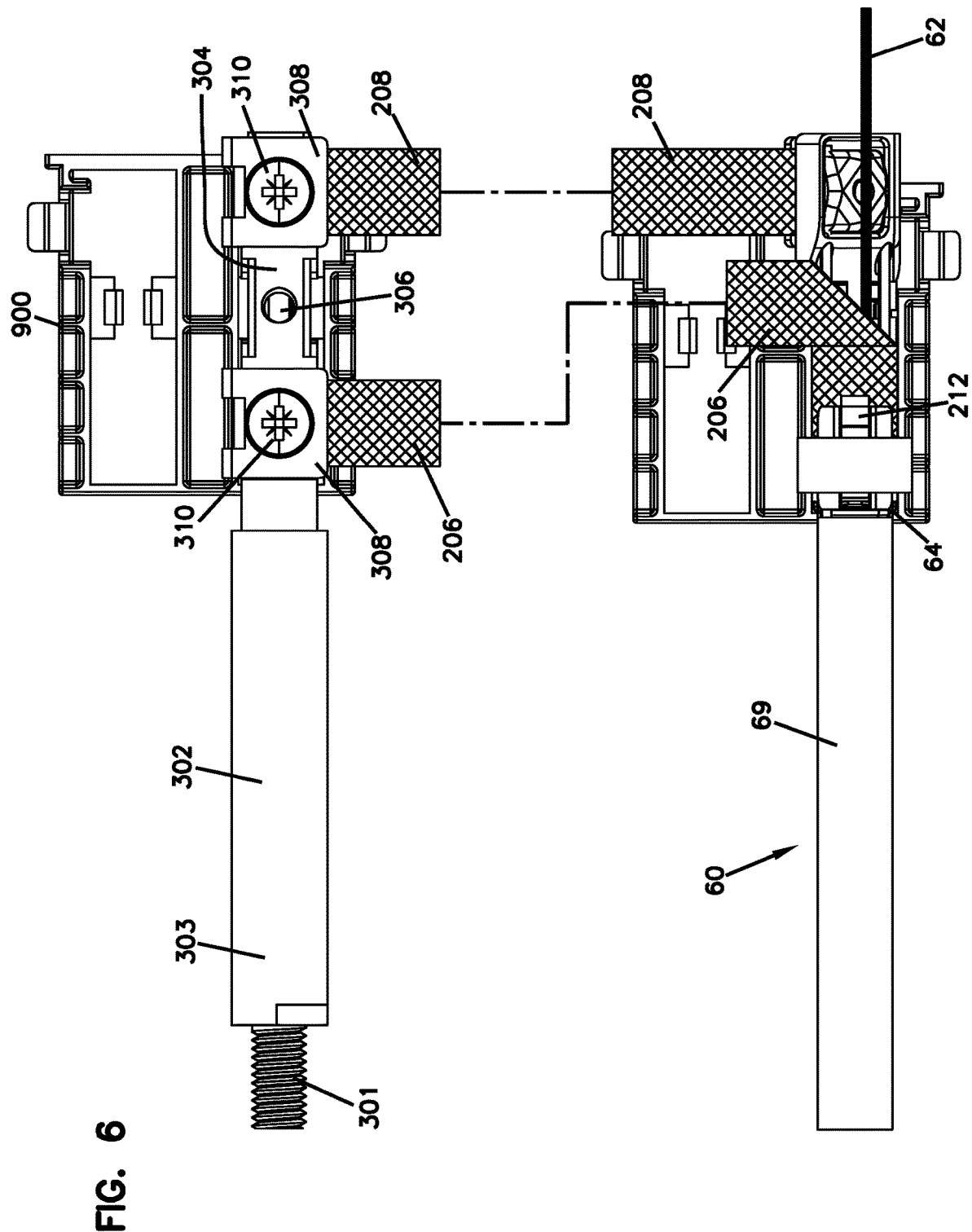
FIG. 6 is a top view of the cable grounding assembly of FIG. 1A, including a portion of the cable of FIG. 1A.

FIG. 3 is an isometric view of the cable grounding assembly 100 of FIG. 1, including a portion of the cable 60. FIG. 4 is a further isometric view of the cable grounding assembly 100 of FIG. 1, including a portion of the cable 60. FIG. 5 is a front view of the cable grounding assembly 100 of FIG. 1, including a portion of the cable 60. FIG. 6 is a top view of the cable grounding assembly 100 of FIG. 1, including a portion of the cable 60.

Referring to FIGS. 3-6, the cable 60 has a central axis $A_1$. One or more optical fibers 62 run along or parallel to the central axis $A_1$. Typically, the optical fibers 62 are coated/jacketed for protection. The optical fibers can be loose or otherwise configured, such as in the form of a ribbon. A non-conductive inner tube 68 is coaxial with the central axis $A_1$ and surrounds and protects the optical fibers 62. A conductive shield 64 is coaxial with the central axis $A_1$ and surrounds the inner tube 68. In this example, the conductive shield 64 includes corrugations 67. In some examples, the conductive shield 64 is coated with a nonconductive film to protect the conductive shield 64 from moisture.

A pair of axial strength members 66 run parallel to the central axis $A_1$ within the outer jacket 69, and provide structural integrity to the cable 60. The strength members 66 are rods that run axially on opposing sides of the cable 60, i.e., the strength members are 180° apart with respect to a radial cross-section of the cable 60 (i.e., a cross-section perpendicular to the axis $A_1$). Typically, the strength members 66 are embedded in the outer jacket or simply disposed between the outer jacket and the conductive shield 64. In some examples, the strength members 66 can be coupled at one or more locations to the inner tube 68.

The grounding assembly 100 includes a cable subassembly 200 and a grounding subassembly 300. The cable subassembly 200 is configured to secure the cable 60 to the insert 10 (FIG. 1) within the enclosure. The cable subassembly 200 is secured to a tray 800. The tray 800 engages the insert 10. In some examples the tray 800 is removably secured to the insert 10. For example, the tray 800 can be received in a complementarily configured bay of the insert 10 and one or more couplers such as latches 802 can be actuated to removably couple the tray 800 to the bay of the insert 10. The tray 800 has a front side 804, a back side 806, a closed bottom 808, and an open top 810. An interior volume of the tray 800 accessible by the open top 910 is divided into a plurality of channels 811. The channels 811 of the tray 800 receive one or more cable subassemblies 200, different channels 811 corresponding to different positions for the cable subassembly, which in turn correspond to different ports 22 and the cables passing through those ports. Thus, each cable subassembly 200 is placed in the tray 800 such that the cable subassembly 200 is properly aligned with the desired port 22 and corresponding cable 60 entering the enclosure.

The cable subassembly 200 includes a cable fixation unit 202, a strength member grounding unit 204, a first grounding conductor 206, a second grounding conductor 208, an adjustable strap 210, and a biasing element 212.

The cable fixation unit 202 is disposed and secured in one of the channels of the tray 800. In a first area of the cable fixation unit 202, the cable fixation unit 202 receives the end or ends of the strap 210. The adjustable strap 210 wraps around at least a portion of the cable 60, and the end(s) of the adjustable strap are secured to the cable fixation unit 202. The first grounding conductor 206 is placed in electrical contact with the conductive shield 64. The biasing element 212 is disposed between a surface of the strap 210 and the first grounding conductor 206. The strap 210 holds the biasing element 212 in a biased configuration that causes the biasing element 212 to apply a force on the first grounding conductor 206 towards the conductive shield 64 and thereby ensure electrical contact between the cable 60 and the grounding conductor 206 even during a relatively high current flow that might degrade other parts of the cable 60, such as causing the jacket 69 to melt.

In some examples, to help establish and/or maintain an electrical contact between the conductive shield 64 and the first grounding conductor 206, a toothed element 214 is placed between the first grounding conductor 206 and the conductive shield 64. The toothed element is made of an electrically conductive material (e.g., a thin, stainless steel). One or more teeth of the toothed element 214 can be configured to pierce a non-conductive protective film covering the conductive shield 64, and in that manner establish or enhance electrical connection between the conductive shield 64 and the first grounding conductor 206.

The first grounding conductor 206 and the second grounding conductor 208 can be any flexible conductor. In the example shown, the grounding conductors are conductive woven braids, e.g., woven aluminum braids. Conductive braids are typically flexible, allowing the braids to be folded and routed easily between the two points of contact on either end of the braids. The grounding conductors 206 and 208 electrically connect the cable subassembly 200 to the grounding subassembly 300.

In a second area of the cable fixation unit 202, the cable fixation unit 202 receives and secures a mounting leg of the strength member grounding unit 204. The strength member grounding unit 204 includes a pair of passages (or passageways) axially aligned with the strength members 66, the passageways receiving terminal portions of the strength members 66. With respect to the embodiment of the strength member grounding unit 204, at least a portion of the strength member grounding unit 204 is electrically conductive. In other embodiments, as described below, the strength member grounding unit need not be electrically conductive. The strength members 66 are in electrical contact with the strength member grounding unit 204 and, in turn, the second grounding conductor 208 is secured, e.g., with a screw 220 and a nut 222, to the strength member grounding unit 204, such that the second grounding conductor 208 is electrically connected to the strength members 66.

Referring to FIG. 5, the central axis $A_1$ of the cable 60 goes into and out of the page. The two strength members 66 are parallel to the axis $A_1$, the axial centers of the two strength members 66 being spaced apart along the axis $A_2$, which will be referred to herein as the strength member alignment axis. The axis $A_2$ thus defines a plane going into and out of the page in FIG. 5, and the central axes of the strength members 66 lie in that plane. A horizontal axis $A_3$ is parallel to the bottom 808 of the tray 800. The bottom 808 of the tray 800 is likewise parallel to at least a portion of the bottom of the enclosure housing 40 in which the insert 10 (FIG. 1) is placed. Still referring to FIG. 5, there is an angle $\theta$ between the horizontal axis $A_3$ and the strength member alignment axis $A_2$. In some examples, the angle $\theta$ is any nonzero number of degrees. In some examples, the angle $\theta$ is between about 30° and about 60°. In particular examples, such as the example shown in the figures, the angle $\theta$ is about 45°.

By orienting the cable 60 such that the axes of the strength members 66 lie in a plane that is oblique to the horizontal plane defined by the axis $A_3$, and particularly in a plane that is at 45° to the horizontal and vertical, the cable 60 is more easily redirected outside of the enclosure and in the vicinity of the enclosure by bending the cable in both the horizontal and vertical planes, as neither type of bending would be within the plane of the strength members. By contrast, for example, if the angle $\theta$ were zero, horizontal bending of the cable outside of the enclosure in the horizontal direction would be considerably more difficult.

Bending (particularly in the horizontal direction) of the cable 60 may be necessary, for example, to achieve a proper alignment of the cable with the port 22 of the insert 10 and to assist in routing the cable outside of the enclosure. At the same time, cables such as the cable 60 with strength members 66 are typically highly ruggedized and relatively rigid, and bending them with precision can present a challenge. The cable subassembly 200 is thus configured to affix the strength members 66 in an orientation that facilitates bending of the cable outside of the enclosure. On the other hand, fixing the strength members in a vertical orientation, i.e., with θ at 90°, can make it more difficult to access the cable fibers for purposes of routing them within the enclosure, as one of the strength members can block or partially block access by a technician to the fibers lying underneath. Thus, it can be particularly advantageous to fix the strength members within the enclosure in neither a vertical plane nor a horizontal plane.

The grounding subassembly 300 is configured to provide a ground to the cable subassembly 200. In particular, the grounding subassembly 300 is configured to provide a ground to the strength members 66 via the strength member grounding unit 204 and the second grounding conductor 208. In addition, the grounding subassembly 300 is configured to provide a ground to the conductive shield 64 via the first grounding conductor 206. Thus, the grounding subassembly 300 provides dual grounding paths for the cable 60, which can provide additional protection against surges.

Each of the first grounding conductor 206 and the second grounding conductor 208 are continuous, or at least conductively continuous, between the cable subassembly 200 and the grounding subassembly 300.

The grounding bar 302 of the grounding subassembly 300 has a mounting portion 304. Each of the grounding conductors 206 and 208 are secured and electrically connected to the mounting portion 304. In the example shown, the grounding conductors 206 and 208 are each secured to at least a top surface 305 of the mounting portion 304. Fasteners 310 (e.g., bolts) and brackets 308 secure the grounding conductors 206 and 208 to the mounting portion 304. In the example shown, threaded holes 306 threadably receive threaded portions of the bolts 310.

The grounding bar 302 is configured to pass through a port 22 (FIG. 1) in the partition 16. At least a portion of a stud 303 of the grounding bar 302 remains outside of the enclosure. A threaded portion 301 of the stud 303 can be attached to a grounding terminal.

The grounding subassembly 300 is secured to a tray 900. The tray 900 can be interchangeable with the tray 800 described above and, in the example shown, the tray 900 is structurally identical to the tray 800. In addition, in some examples, the grounding subassembly 300 and the cable subassembly 200 can both be secured in the same tray 800 or 900. The tray 900 engages the insert 10. In some examples the tray 900 is removably secured to the insert 10. For example, the tray 900 can be received in a complementarily configured bay of the insert 10 and one or more couplers such as latches 902 can be actuated to reversibly couple the tray 900 to the bay of the insert 10. The tray 900 has a front side 904, a back side 906, a closed bottom 908, and an open top 910. An interior volume of the tray 900 accessible by the open top 910 is divided into a plurality of channels 911. The channels 911 of the tray 900 receive one or more grounding subassemblies 300, different channels 911 corresponding to different positions for the grounding subassembly, which in turn correspond to different ports 22 and the grounding bar 302 passing through those ports. Thus, each grounding subassembly 300 is placed in the tray 900 such that the grounding bar 302 is properly aligned with a port 22 (FIGS. 1-2).

It should be appreciated that the number of trays 800, 900 and the number of cable subassemblies 200 and grounding subassemblies 300 can be adjusted and customized according to specific requirements for a given telecommunications enclosure and, for example, the number of cables that are to pass through the partition 16 of the assembly 10 (FIGS. 1-2).

Figure 7:
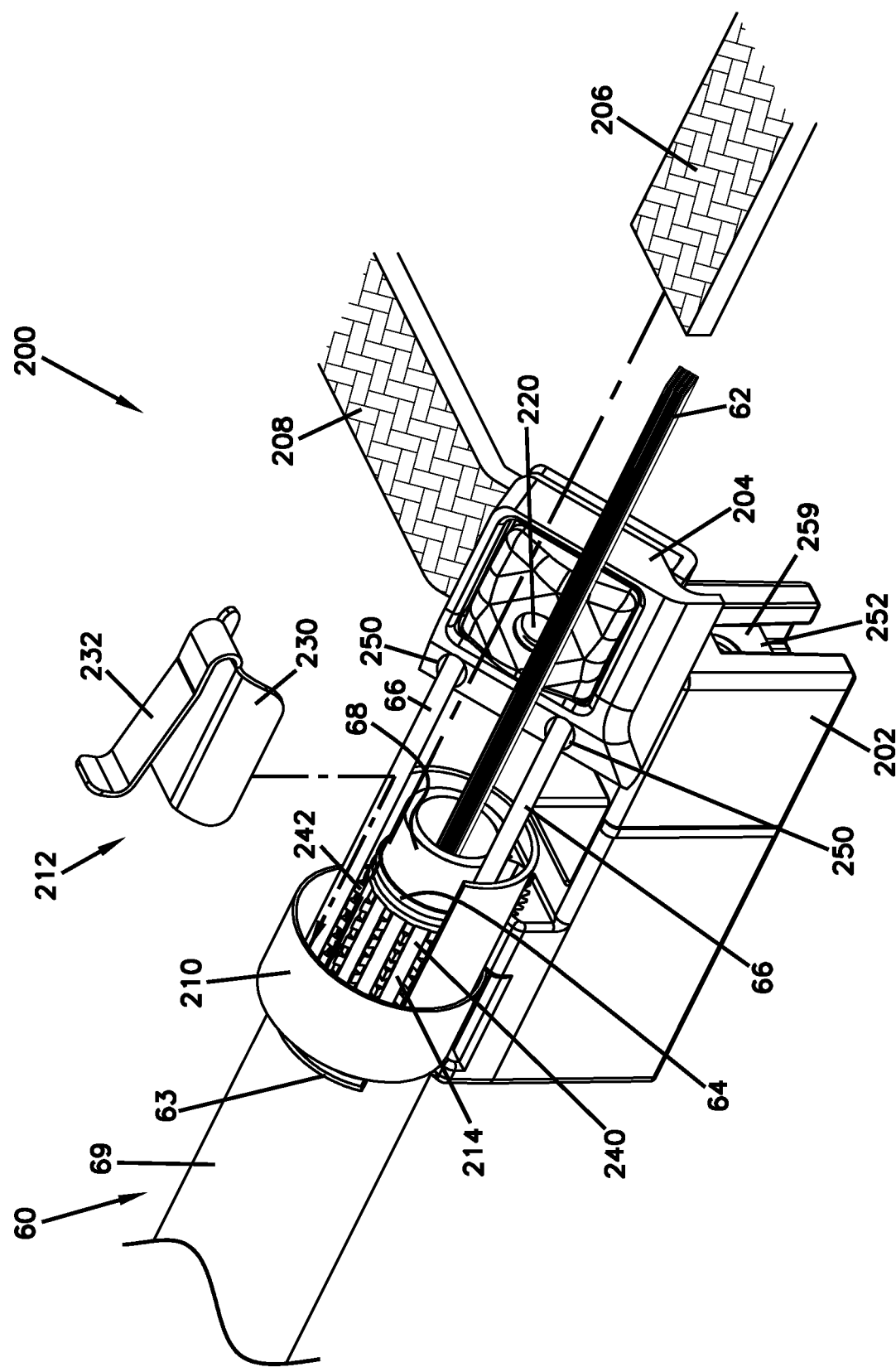
FIG. 7 is a partially exploded isometric view of the cable subassembly of FIG. 3 and a portion of the cable of FIG. 3.
Figure 8:
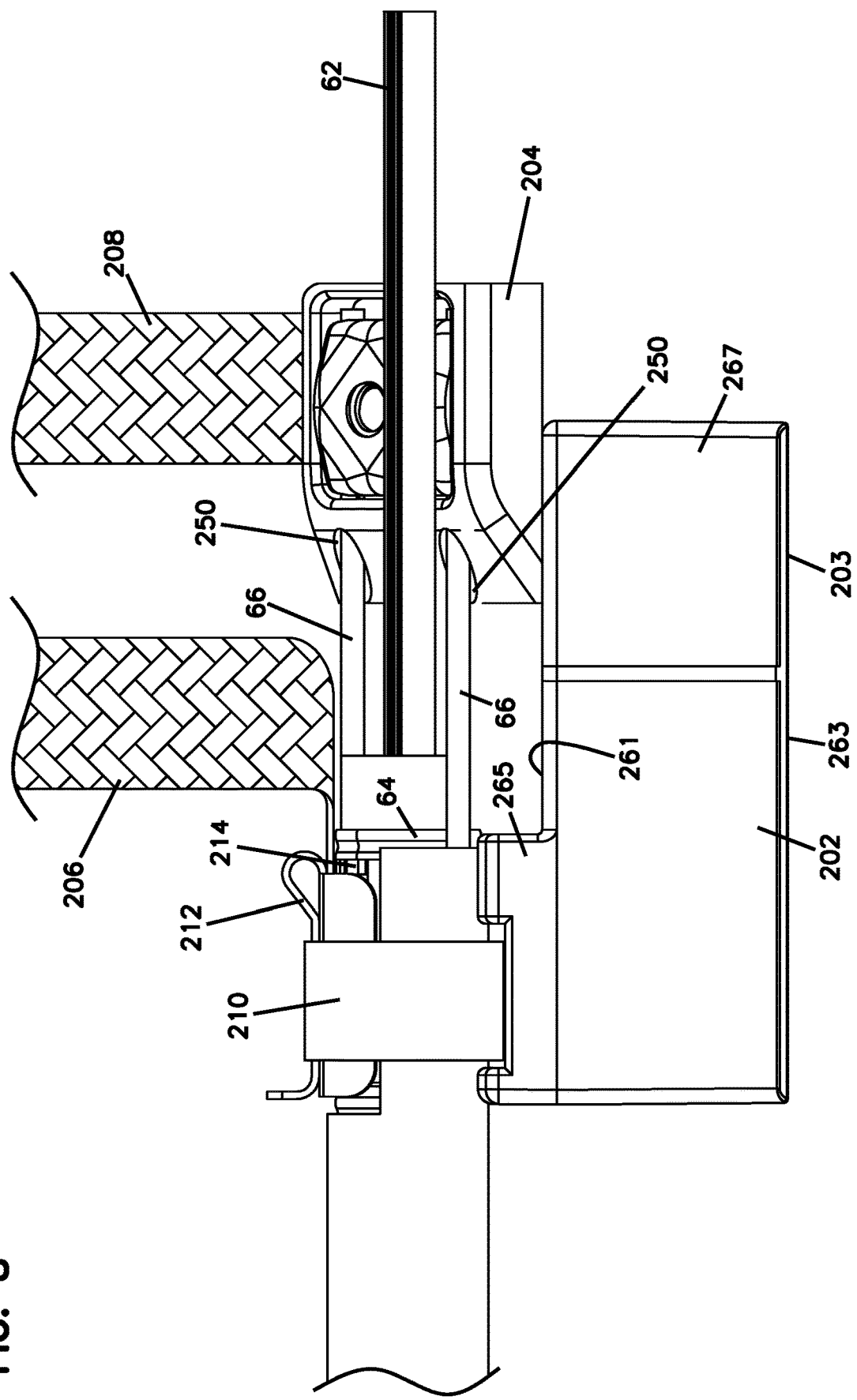
FIG. 8 is a side view of the cable subassembly and a cable portion of FIG. 3.
Figure 9:
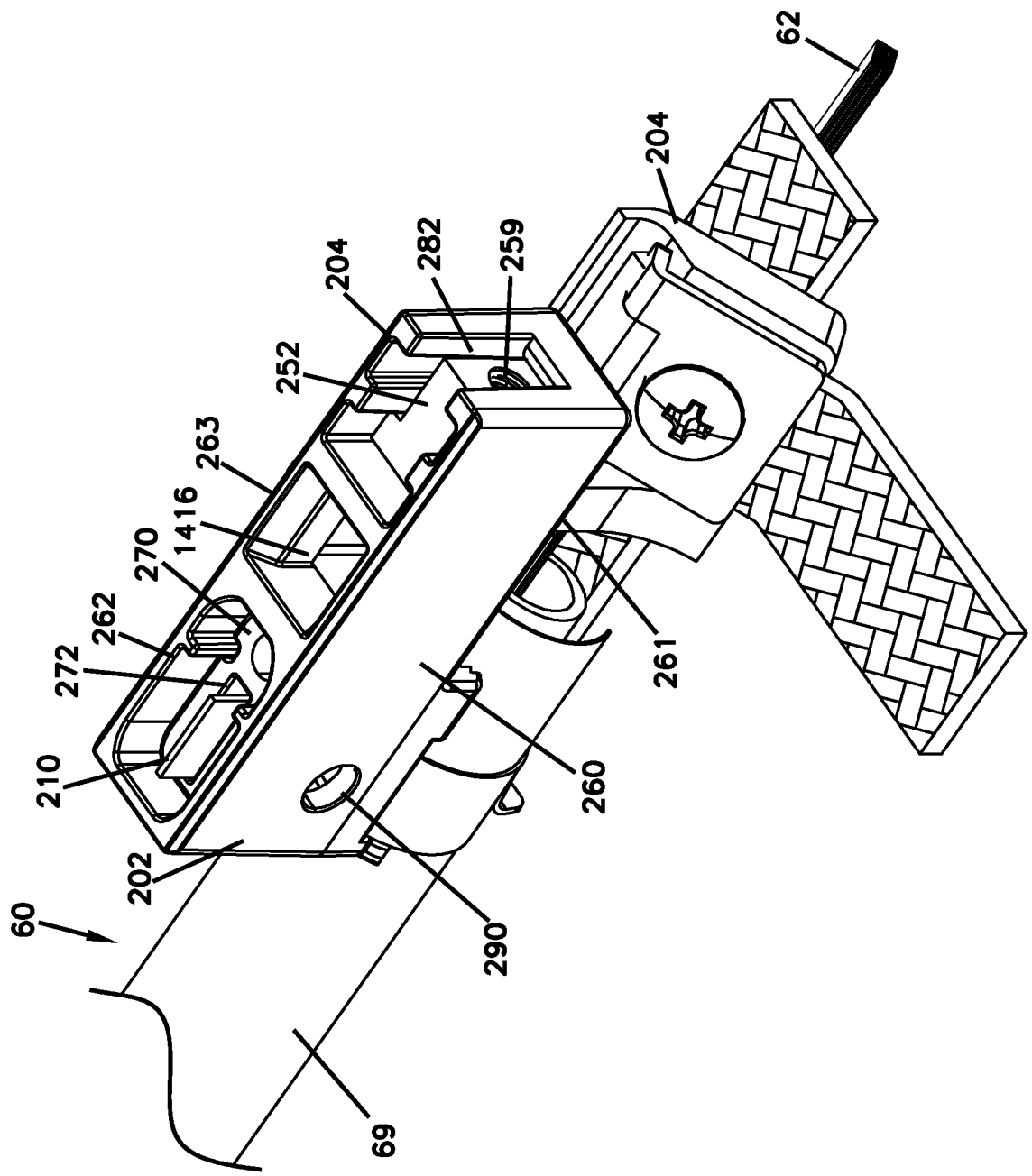
FIG. 9 is a further isometric view of the cable subassembly and a cable portion of FIG. 3.

FIG. 7 is a partially exploded isometric view of the cable subassembly 200 of FIG. 3 and a portion of the cable 60 of FIG. 3. FIG. 8 is a side view of the cable subassembly 200 and a cable portion of FIG. 3. FIG. 9 is a further isometric view of the cable subassembly 200 and a cable portion of FIG. 3.

Referring to FIGS. 7-9, the biasing element 212 includes a contoured base 230 and an action arm 232. When pressed (e.g., by the strap 210) towards the contoured base 230, the action arm 232 provides a biasing force on the base 230. The base 230 is configured to fit over the conductive shield 64 and/or the toothed element 214.

The toothed element 214 includes a surface 240. Protruding inward from the surface 240 are a plurality of teeth 242 configured to pierce a protective film on the conductive shield 64.

Cleaved terminal ends of the strength members 66 are received in channels/passages 250 of the strength member grounding unit 204, with central axes of the channels/passages 250 lying in the plane defined by the axis $A_2$ in FIG. 5.

The cable fixation unit 202 has a main body 260 having a horizontal bottom surface 266. A first cavity 262 extends between a top 261 and a bottom 263 of the cable fixation unit 202 in a first tier 265 of the main body 260. A second cavity 264 extends between the top 261 and the bottom 263 in a second tier 267 of the main body 260, the second tier 267 having a lesser height between the bottom 263 and the top 261 than the first tier 265.

The first cavity 262 receives a strap block 270. A slot 272 in the strap block receives ends of the strap 210, and the strap 210 can be secured to a particularly sized cable by adjusting the length of strap segments that are secured to the slot 272. The strap block 270 is shaped and sized in complementary manner to the first cavity 262. The strap block 270 is fastened to the main body 260.

The second cavity 264 receives the mounting leg 252 of the strength member grounding unit 204. The mounting leg is shaped and sized in complementary manner to the second cavity 264. The mounting leg 252 is fastened to the main body 260, which thereby fixates the strength member grounding unit 204 in the desired orientation.

Figure 10:
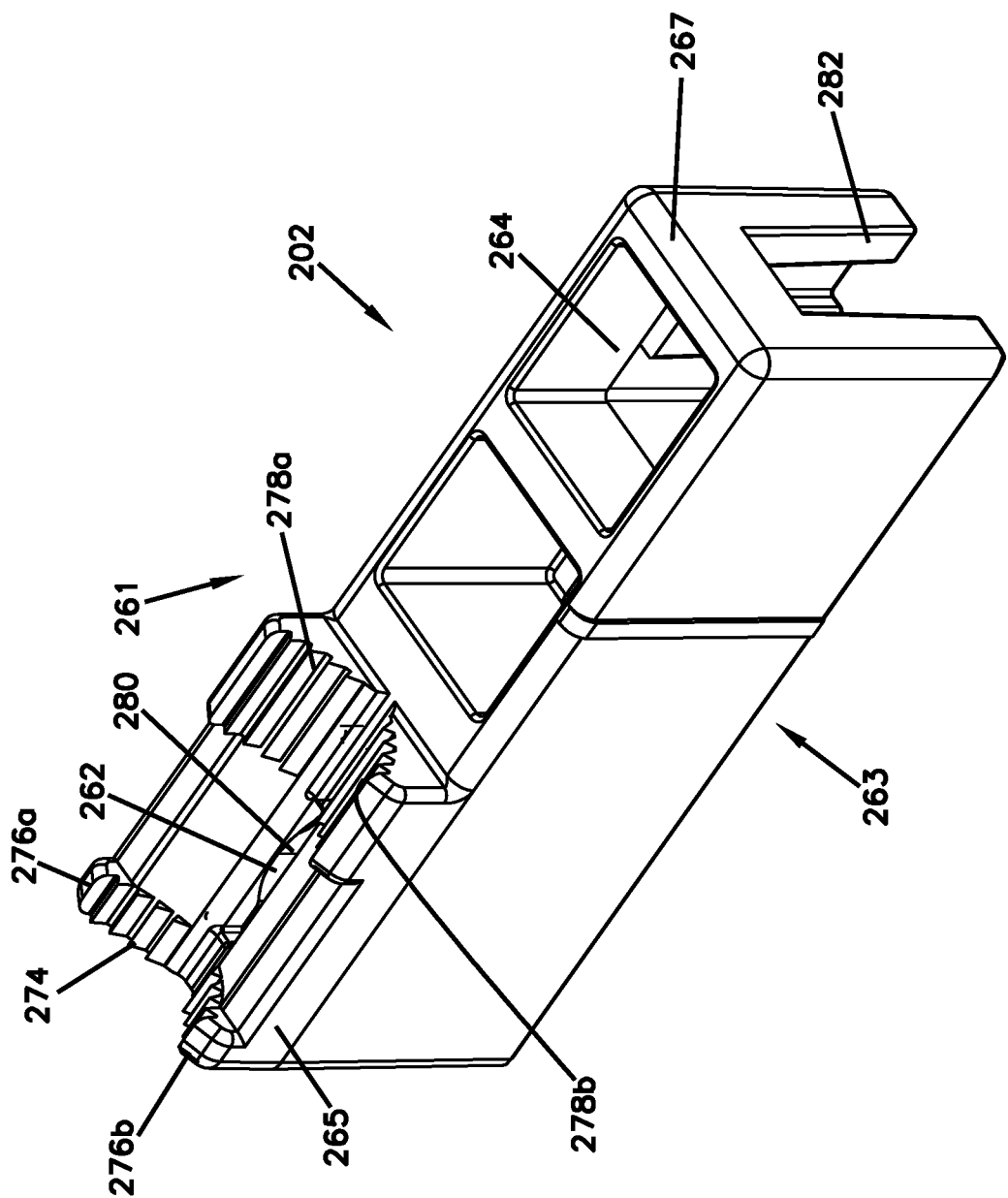
FIG. 10 is an isometric view of the example cable fixation unit used in the cable subassembly of FIG. 3.

FIG. 10 is an isometric view of the example cable fixation unit 202 used in the cable subassembly 200 of FIG. 3. The first tier 265 includes a cable support 274. The cable support 274 consists of two arms 276a and 276b forming a channel therebetween for receiving a cable 60 or a portion thereof (e.g., a portion of a cable stripped or partially stripped of its outer jacket 69). The arms 276a and 276b include stepped ribbed surfaces 278a and 278b, respectively, which can provide different cable resting surfaces for different sized cables (i.e., cables of different widths). Between the two arms 276a and 276b is provided an entry slot 280 for insertion of the strap 210 into the first cavity 262. An opening 282 at the front of the cable fixation unit 202 can provide access to the second cavity 264, and thereby the mounting leg 252 of the strength member grounding unit 204. In this manner, one or more fasteners can be installed and/or adjusted via the opening 282 in order to mount the strength member grounding unit 204 in the desired position with respect to the cable fixation unit 202.

Figure 11A:
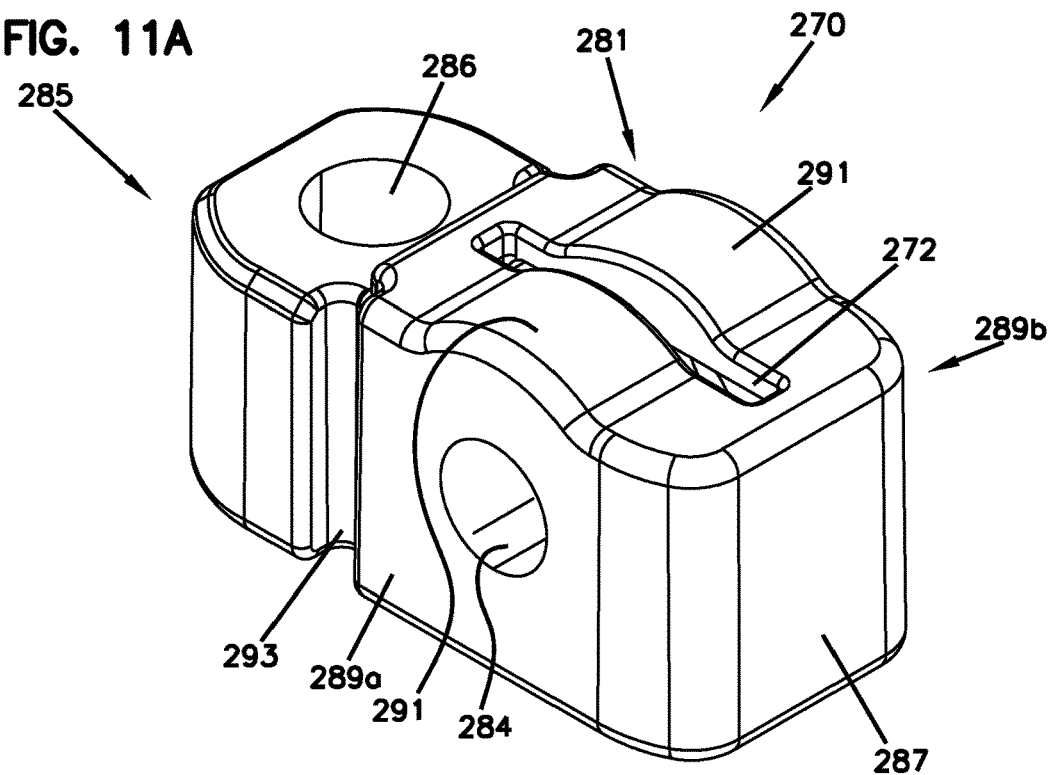
FIG. 11A is an isometric view of the example strap block used in the cable fixation unit of the cable subassembly of FIG. 3.
Figure 11B:
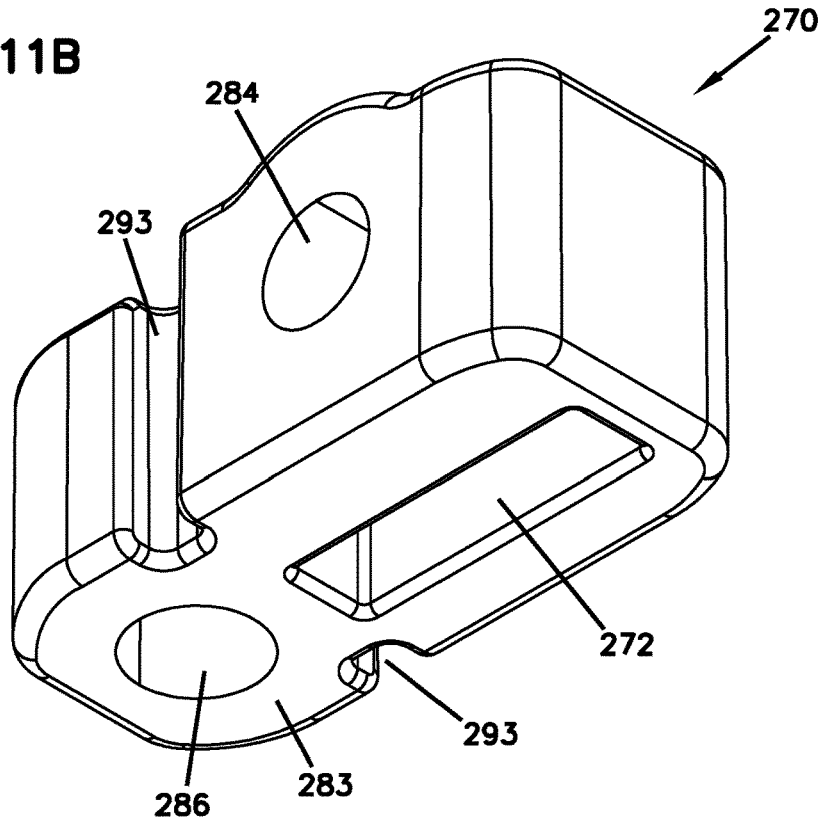
FIG. 11B is a further isometric view of the strap block of FIG. 11A.

FIG. 11A is an isometric view of the example strap block 270 used in the fixation unit 202 of the cable subassembly 200 of FIG. 3. FIG. 11B is a further isometric view of the strap block 270 of FIG. 11A.

Referring to FIGS. 11A and 11B (collectively, FIG. 11), the strap block 270 includes a top 281, a bottom 283, a front 285, a back 287, and opposing sides 289a and 289b. The strap block 270 includes one or more features that can provide a complementary fit with corresponding features within the first cavity 262 of the cable fixation unit 202. For example, the humps 291 and grooves 293 can provide a nesting disposition of the strap block 270 within the first cavity 262, which can inhibit or prevent one or more directions of motion by the strap block 270 within the first cavity 262.

The slot 272 extends from the top 281 to the bottom 283 of the strap block 270. A horizontally oriented hole 284 through one or both sides (289a, 289b) communicates with the interior of the slot 272. The hole 284 can be configured to receive a fastener (e.g., a bolt) for securing the strap 210 within the slot 272 at the desired position on the strap, the position being selected based on the width of the cable 60.

A vertically oriented hole 286 through the bottom 283 and the top 281 of the strap block 270 can be configured to receive a fastener (e.g., a bolt), to help secure the strap block 270 to the cable fixation unit 202.

Figure 12:
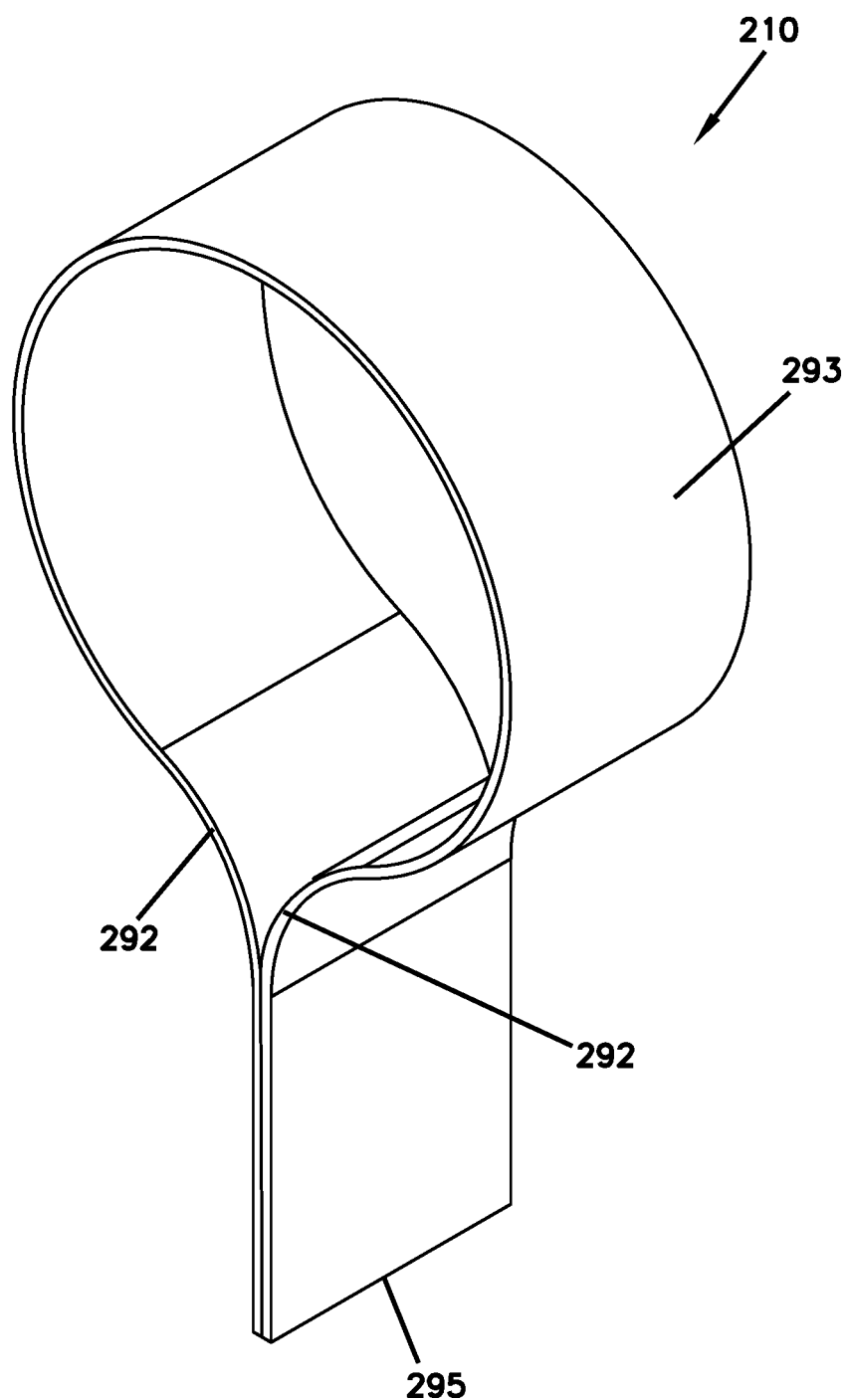
FIG. 12 is an isometric view of the example strap used in the cable fixation unit of the cable subassembly of FIG. 3.

FIG. 12 is an isometric view of the example strap 210 used in the cable fixation unit 202 of the cable subassembly 200 of FIG. 3.

The strap 210 comprises a strip, e.g., of a bendable and/or conductive material, the strap having two ends 292 and 295 which, in some examples, can be fused together to form a single end. A loop 293 is formed between the ends 292 and 295. The size of the loop 293 is adjustable and can be adjusted based on the size of the cable to be clamped to the cable fixation unit 202. The two ends 292 and 295 are brought together to tighten the loop 293 about a cable, and a fastener (e.g., a set screw) can be placed through the cable fixation unit 202, the strap block 270, and pressed up against the ends (292, 295) of the strap 210 to thereby secure the strap 210 around the cable in one of a plurality of selectable size configurations for the strap 210.

Figure 13:
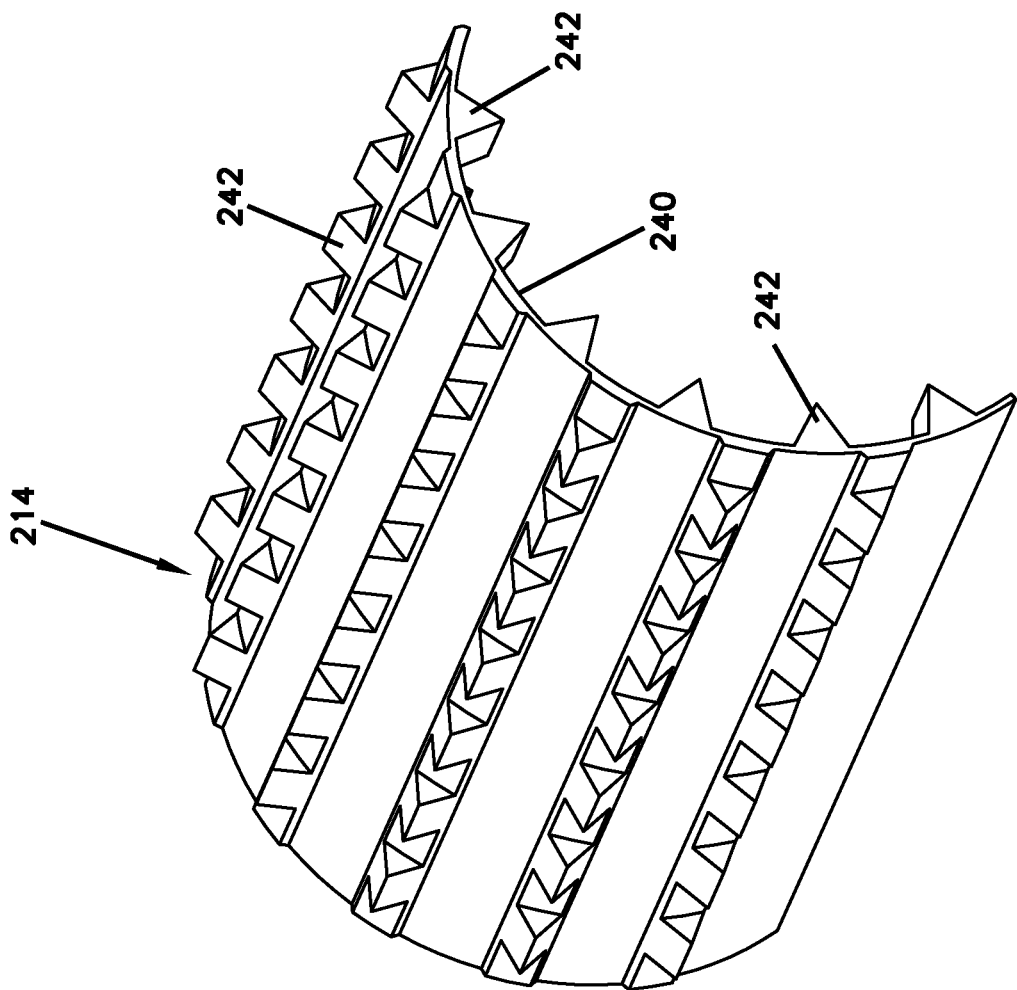
FIG. 13 is an isometric view of the example toothed element used in the cable fixation unit of the cable subassembly of FIG. 3.

FIG. 13 is an isometric view of the example toothed element 214 used in the cable fixation unit 202 of the cable subassembly 200 of FIG. 3. The toothed element 214 includes a concave surface 240 adapted to follow the curved exterior contour of the conductive shield 64 of the cable 60. The toothed element 214 can be flexible and thereby adapted to different sized cables (having different sized conductive shields). The toothed element 214 is made from electrically conductive material and includes a plurality of teeth 242 projecting from at least the concave surface 240. In the examples shown, the teeth 242 project in parallel longitudinal rows from the concave surface 240. As described above, the teeth 242 are adapted to pierce a non-conductive film coating of the conductive shield 64, and thereby provide an electrical contact between the conductive shield 64 and the first grounding conductor 206.

Figure 14A:
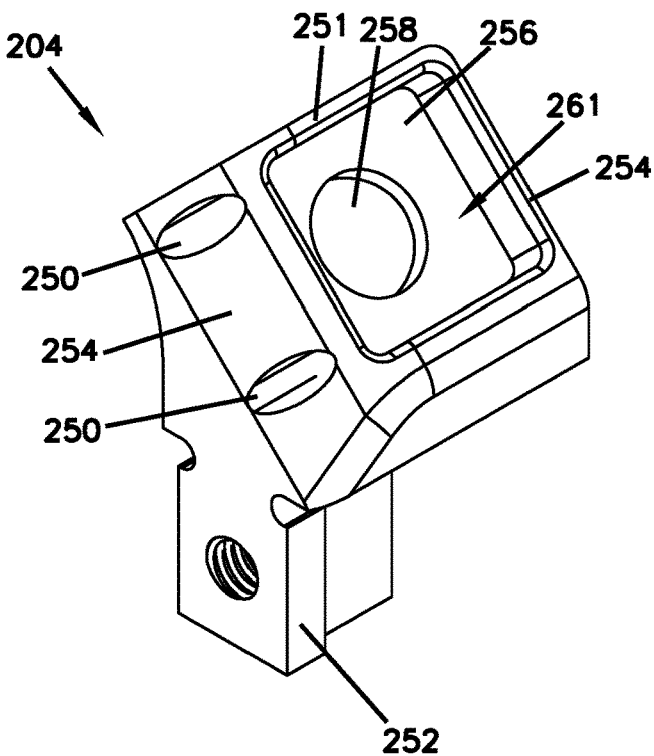
FIG. 14A is an isometric view of the example strength member grounding unit that can be used in the cable subassembly of FIG. 3.
Figure 14B:
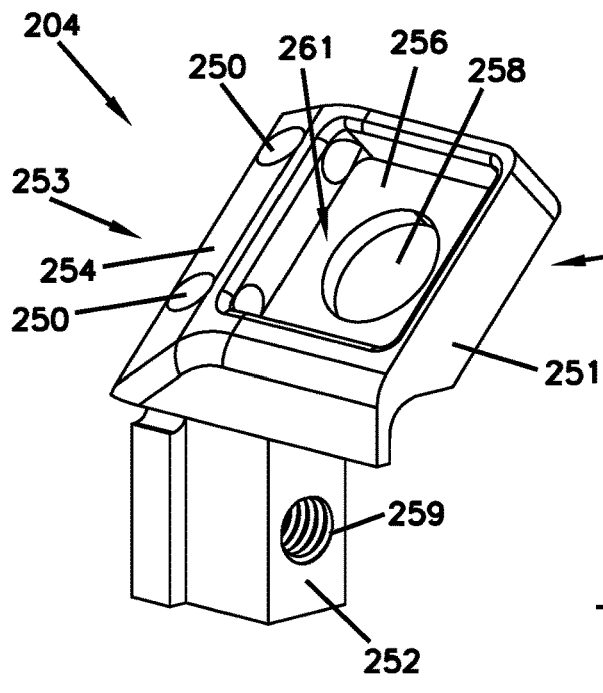
FIG. 14B is a further isometric view of the example strength member grounding unit of FIG. 14A.
Figure 14C:
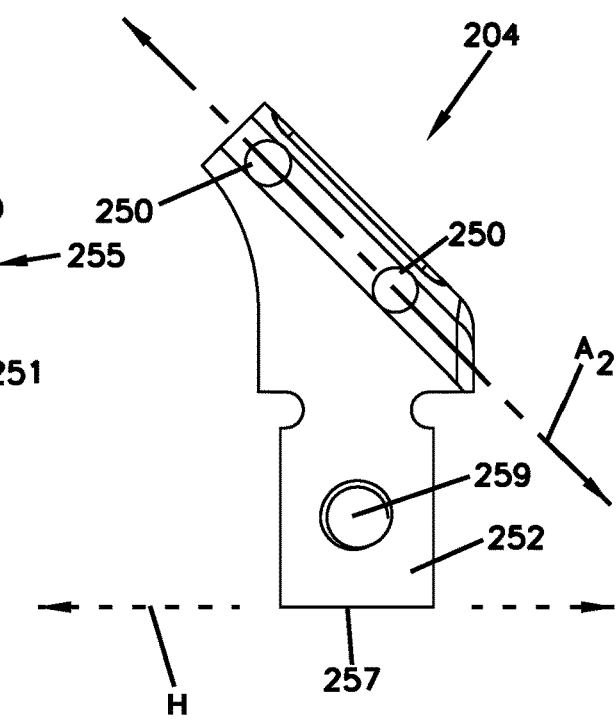
FIG. 14C is a front view of the strength member grounding unit of FIG. 14A.

FIG. 14A is an isometric view of the example strength member grounding unit 204 that can be used in the cable subassembly 200 of FIG. 3. FIG. 14B is a further isometric view of the example strength member grounding unit 204 of FIG. 14A. FIG. 14C is a front view of the strength member grounding unit 204 of FIG. 14A.

Referring to FIGS. 14A, 14B, and 14C (collectively, FIG. 14), the strength member grounding unit 204 generally includes a head portion 251 and the leg 252 (described above) extending from the head portion 251 to a bottom 257 of the strength member grounding unit 204. The head portion 251 has a front 253 and a back 255. The two channels/passages 250 extend through a front portion of the surrounding wall 254 of the head portion 251, and are in communication with a recessed platform 256 of the head portion 251. The recessed platform 256 is surrounded by the surrounding wall 254. There is a hole 258 through the recessed platform 256.

In the subassembly 200, free ends of the strength members 66 pass through the passages 250 and are received in the space 261 defined by the recessed platform 256 and the surrounding wall 254. The cleaved ends of the strength members 66 can then be sandwiched between the recessed platform 256 and the nut 222 (FIG. 3), the nut being secured within the space 261, e.g., by being screwed on to a threaded bolt extending through the hole 258.

A threaded hole 259 in the leg 252 is positioned to be accessible via the opening 282 (FIG. 9) in the cable fixation unit 202, the threaded hole 259 configured to receive a fastener, e.g., a bolt, for securing and/or adjusting the position of the strength member grounding unit 204 relative to the cable fixation unit 202.

Referring to FIG. 14C, the central longitudinal axis of the channels/passages 250 extend into the page. The channels/passages 250 are parallel to each other on an incline relative to the horizontal, the horizontal being represented by the line H. As discussed above, the axis $A_2$ defines a plane (into and out of the page in FIG. 14C) that is inclined relative to the horizontal by a non-zero angle. In the example shown in FIG. 14C, the angle between the lines H and $A_2$ is approximately 45°.

Figure 15:
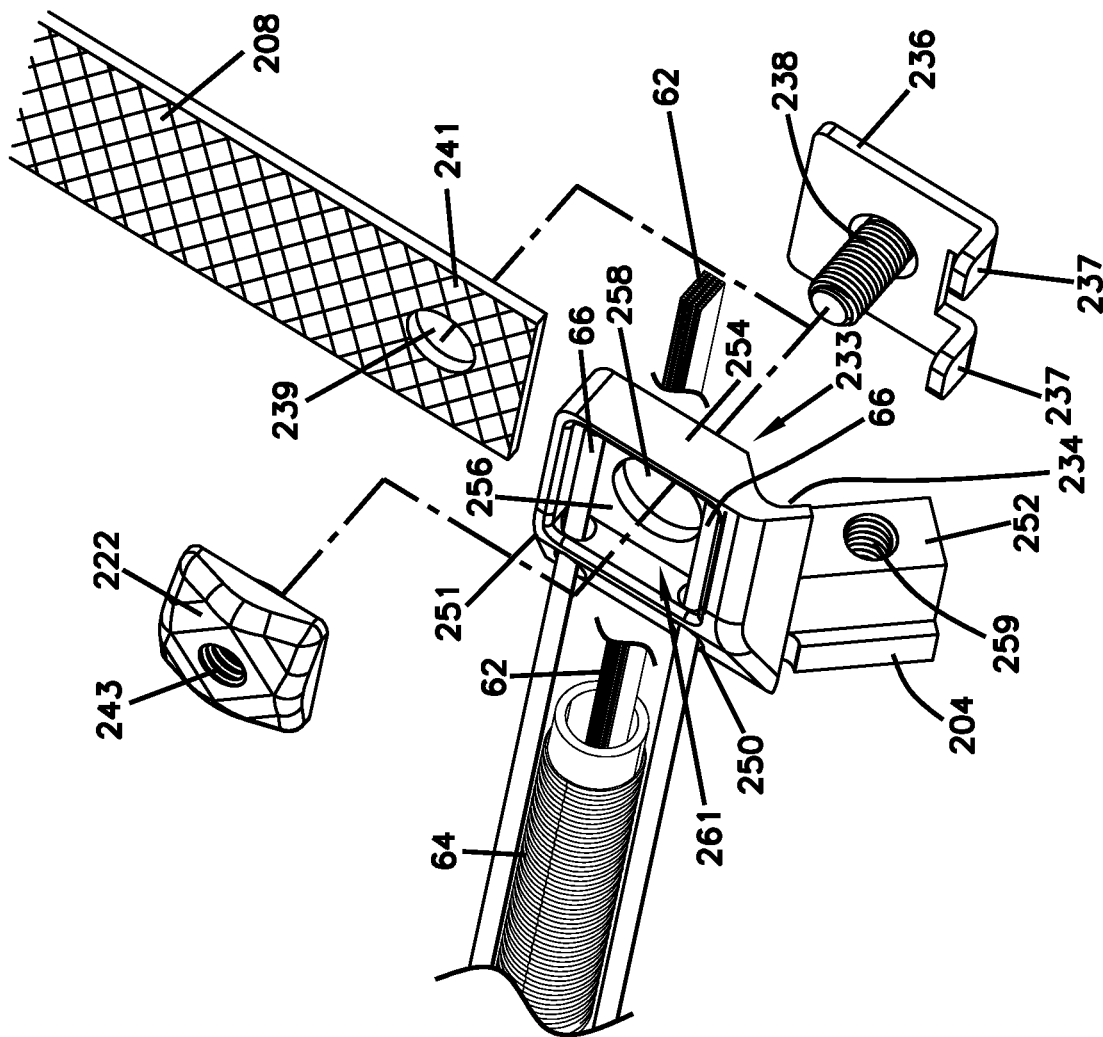
FIG. 15 is an exploded view of a portion of the cable subassembly of FIG. 3 with the cable jacket not shown.

FIG. 15 is an exploded view of a portion of the cable subassembly 200 of FIG. 3 with the cable jacket not shown. FIG. 15 depicts a coupling of the strength members 66 of the cable to the strength member grounding unit 204 and the second grounding conductor 208. As depicted, end portions of the strength members 66 have been inserted through the channels/passages 250 and are disposed in the space 261 above the recessed platform 256.

To electrically connect the second grounding conductor 208 to the strength members 66, an end portion 241 of the grounding conductor is disposed on an underside 233 of the head portion 251 of the strength member grounding unit 204 such that a hole 239 in the second grounding conductor 208 is aligned with the hole 258 in the recessed platform 256. The end portion 241 of the second grounding conductor 208 is then sandwiched between the underside 233 of the head portion 251 and a bracket 236. A bolt 238 passes through the bracket 236 and is aligned with the hole 258 and with a hole 243 of the nut 222. An electrical connection is thereby established between the strength members 66, the head portion 251 of the strength member grounding unit 204, and the second grounding conductor 208, the head portion 251 being constructed of an electrically conductive material. The legs 237 of the bracket 236 can be received in a groove 234 on the underside of the head portion 251. In some examples, as shown in FIG. 15, the nut 222 is configured to nest within the space 261 bounded by the surrounding wall 254 of the head portion 251.

Figure 16:
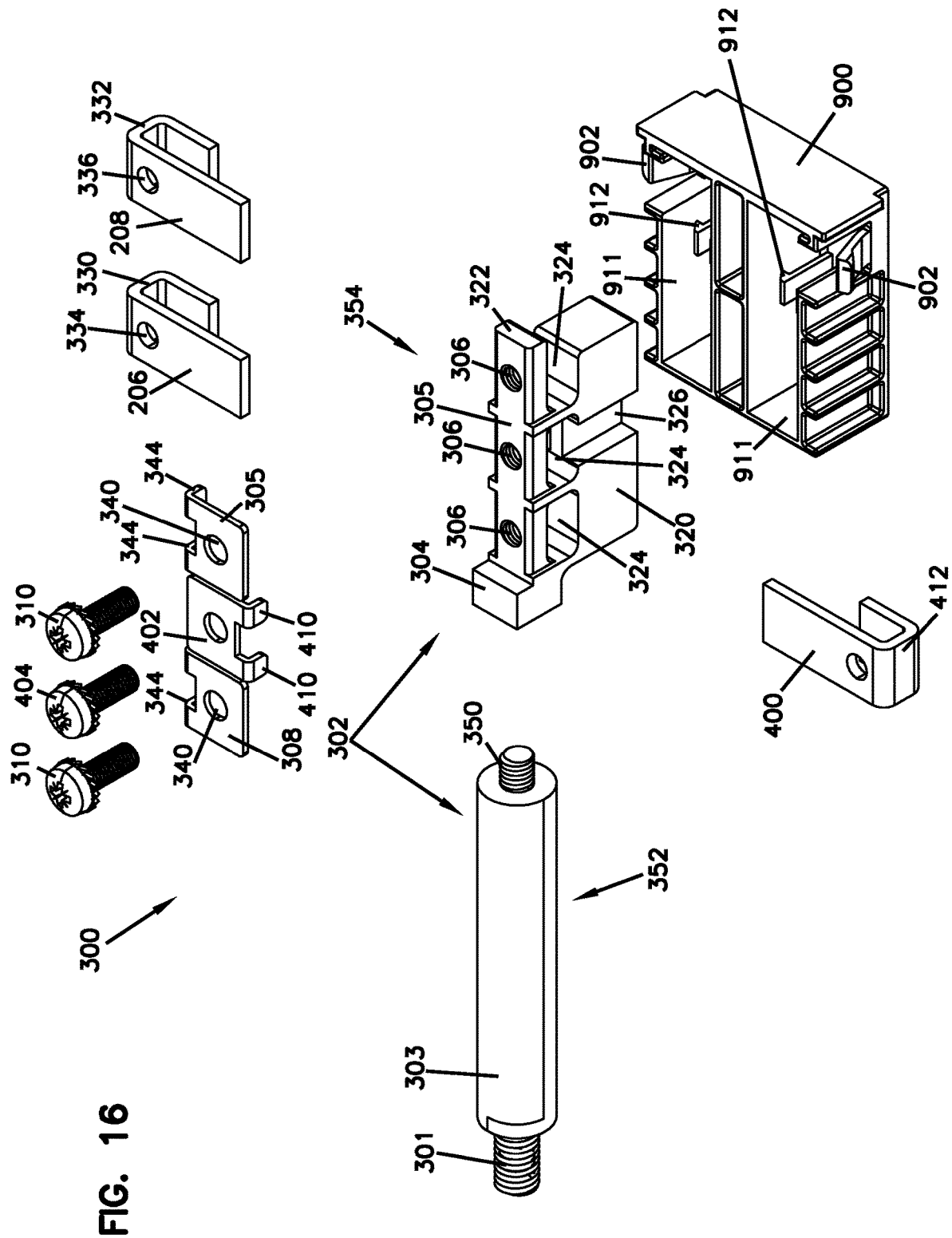
FIG. 16 is an exploded isometric view of the grounding subassembly and the tray of FIG. 3.

FIG. 16 is an exploded isometric view of the grounding subassembly 300 and the tray 900 of FIG. 3.

Referring to FIG. 16, the mounting portion 304 of the grounding bar 302 is configured to be secured in one of the channels 911 of the tray 900. The mounting portion 304 includes a base 320 and a horizontal rod 322. The horizontal rod 322 is integral with, or otherwise connected to the base 320. The threaded holes 306 extend vertically through the rod 322 at three horizontal positions on the rod 322. At each of the three positions, there is a gap 324 between the rod 322 and the base 320.

In the example shown in FIG. 16, the grounding bar 302 consists of two pieces—a first piece 352 and a second piece 354. The first and second pieces can be couplable together, e.g., by a threaded end 350 of the first piece 352 mating with a corresponding threaded socket of the second piece 354.

A vertical groove 326 in the side of the base 320 is configured to receive an interior flexibly resilient latch 912 of the channel 911. Thus, the base 320 can be inserted into the channel 911 and the hooked portion of the interior latch 912 can snap over the base 320 above the vertical groove 326 to secure the base 320 in the channel 911.

The first and second grounding conductors 206 and 208 have end portions 330 and 332, respectively, which are opposite the end portions of the grounding conductors that are secured to the cable subassembly 200. The end portions 330 and 332 can be wrapped around the rod 322 at two of the three positions of the threaded holes 306 such that holes (334, 336) in the end portions 330 and 332, respectively, of the grounding conductors 206 and 208 can be electrically secured to the rod 322 via two of the brackets 308 and two of the bolts 310 that pass through the bracket holes 340, the grounding conductor holes (334, 336) and the threaded holes 306. Legs 344 of the brackets can be oriented to hug the end portions 330 and 332 of grounding conductors 206 and 208 against the side of the rod 322.

In the cable grounding assembly 100 of the present disclosure, just one cable 60 is grounded. The one cable 60 is grounded in two ways—via the conductive shield 64 and via the strength members 66. Each grounding path is provided with a grounding conductor. Thus, to ground one cable in accordance with present disclosure can require two grounding conductors (206, 208), which couple to the mounting portion 304 of the grounding bar 302.

It should be appreciated that a cable grounding assembly can include a plurality of cable subassemblies 200 and/or a plurality of grounding subassemblies 300. Thus, for example, the enclosure can accommodate multiple trays (800, 900), and each of the trays has multiple channels (811, 911) to accommodate multiple cable subassemblies 200 and/or grounding subassemblies 300.

It should also be appreciated that the same grounding bar 302 can be used to ground multiple cables. Thus, for example, as depicted in FIG. 16, the mounting portion 304 has three positions at which to couple grounding conductors, and an assembly of a third grounding conductor 400, a bracket 402, and a bolt 404 can be used to ground a second cable or a portion of a second cable to the grounding bar 302. If the grounding bar 302 is placed in the enclosure between the cable 60 and a second cable, the third grounding conductor 400 can be routed within the enclosure in the opposite direction as the first and second grounding conductors 206 and 208, i.e., towards the second cable rather than towards the cable 60. Thus, as shown in FIG. 15, the legs 410 of the bracket 402, and the end portion 412 of the third grounding conductor 400 are oriented, respectively, opposite to that of the legs 344 and the end portions 330 and 332.

Figure 17:
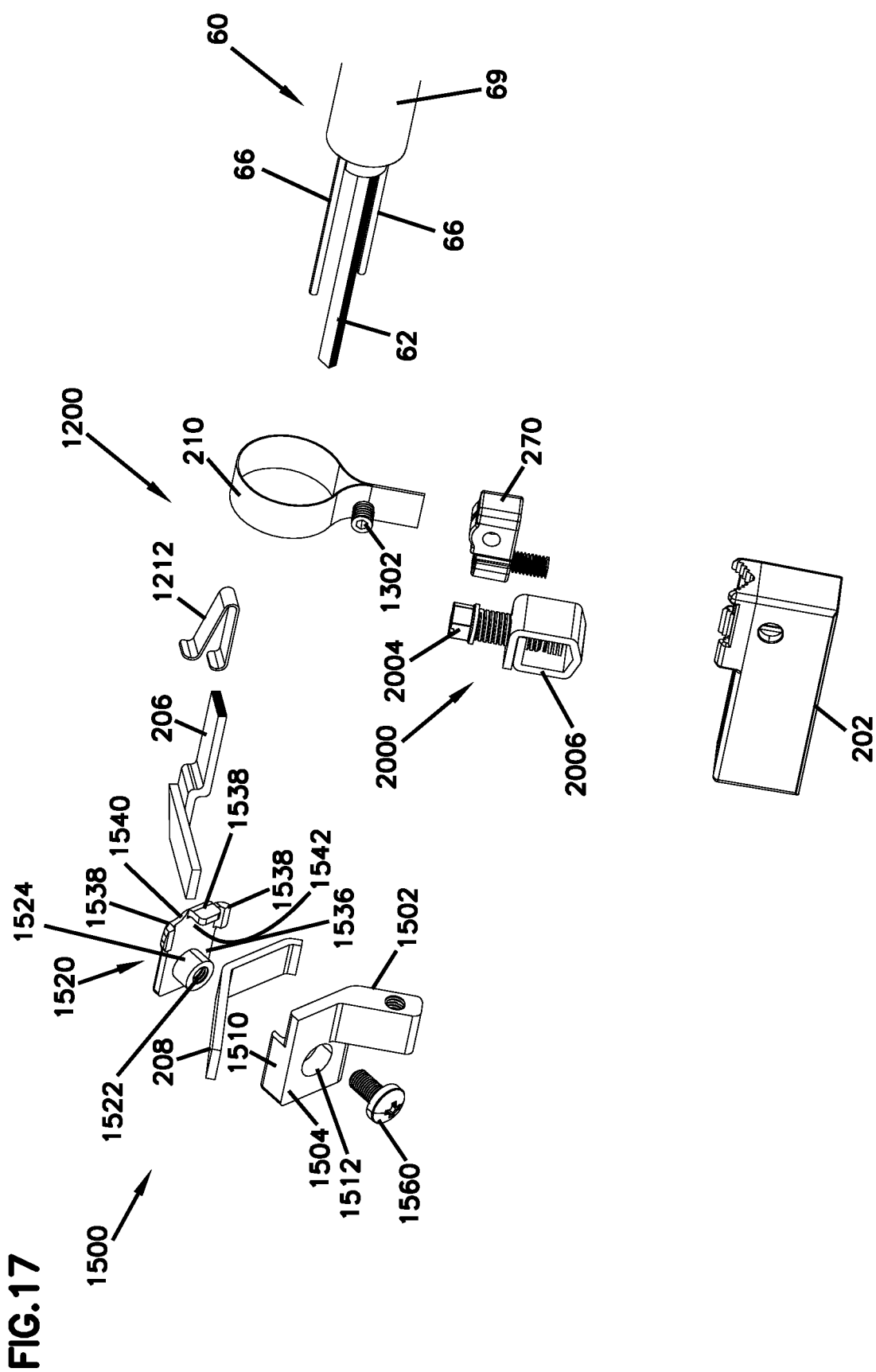
FIG. 17 is an exploded view of a further example of a cable subassembly in accordance with the present disclosure and the cable of FIG. 3.
Figure 18:
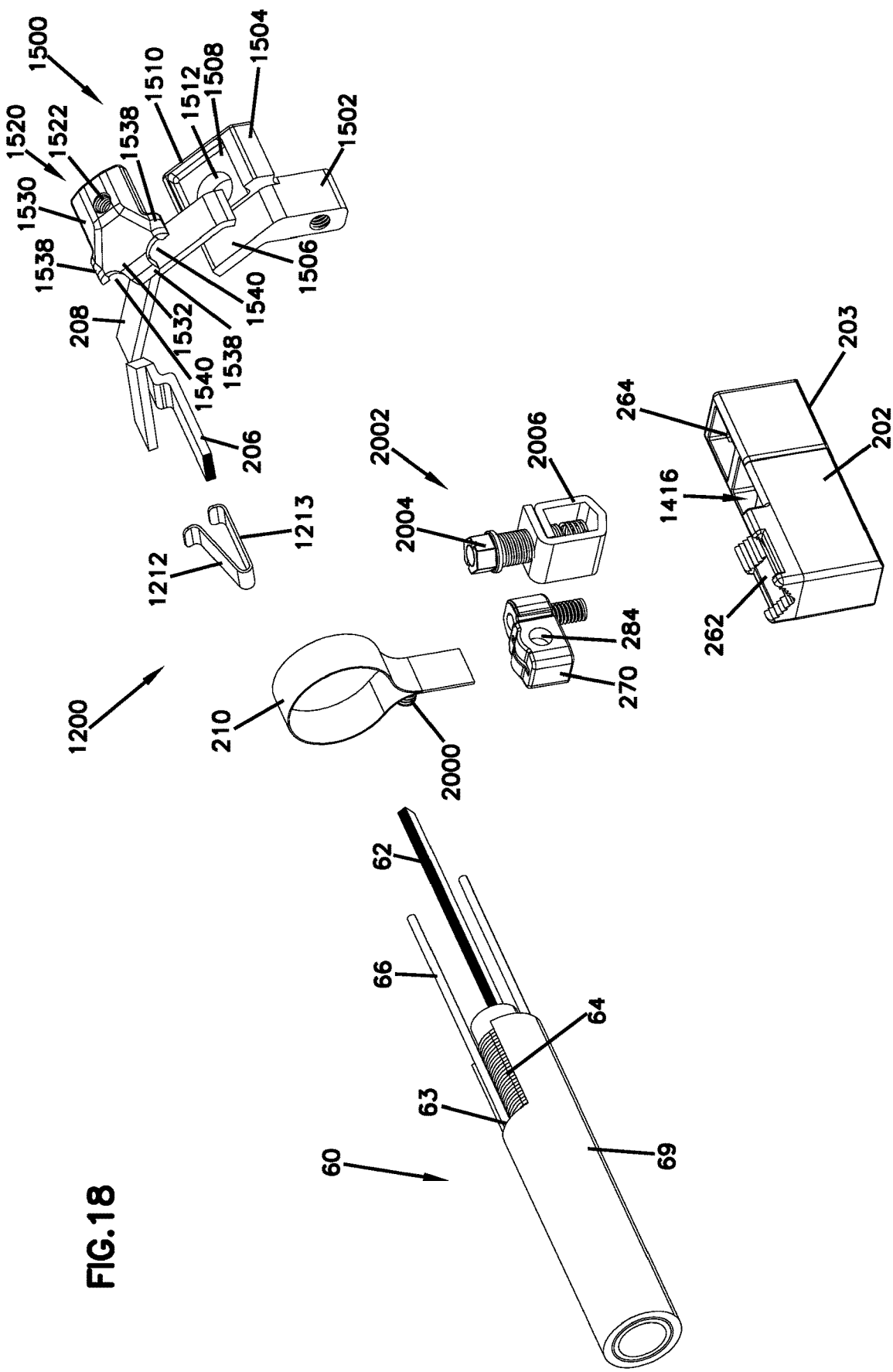
FIG. 18 is a further exploded view of the cable subassembly of FIG. 17 and the cable of FIG. 3.

FIG. 17 is an exploded view of a further example of a cable subassembly 1200 in accordance with the present disclosure and the cable 60 of FIG. 3. FIG. 18 is a further exploded view of the cable subassembly 1200 of FIG. 17 and the cable 60 of FIG. 3. The cable subassembly 1200 can be used to affix the cable 60 and includes the cable fixation unit 202, first and second grounding conductors 206 and 208, the adjustable strap 210, and the strap block 270 as described above.

The strap 210 can be mounted within the cable fixation unit 202 using the strap block 270 in the manner described above, as well as a fastener, such as the set screw 2000, which can be threadably installed in the horizontally oriented hole 284 of the strap block 270.

In the subassembly 1200, a further embodiment of a biasing element 1212 is used, which is configured somewhat differently from the biasing element 212 discussed above but is positioned and functions in substantially the same manner as the biasing element 212. The biasing element 1212 has a relatively narrow base 1213, which may be suitable, e.g., for biasing a relatively narrow grounding conductor.

The subassembly 1200 also includes a fixation unit mounting block 2002. The fixation mounting block 2002 can be used to secure the cable fixation unit 202 of the subassembly 1200 or the subassembly 200 to the tray 800 and/or to a wall of the enclosure housing 40. The mounting block 2002 in this example includes a bolt 2004 that can be threadably mated with a nut 2006. The bolt can be inserted into a third cavity 1416 in the cable fixation unit. In this example, the third cavity 1416 is disposed between the first cavity 262 and the second cavity 264. The nut 2006 can be positioned below the bottom 203 of the cable fixation unit 202, and optionally sandwich a bottom surface of the tray 800 and/or a wall of the enclosure housing 40 between the bottom 203 and the nut 2006 when the nut 2006 and the bolt 2004 are threadably mated.

The subassembly 1200 also includes a further example embodiment of a strength member grounding unit 1500. The strength member grounding unit 1500 includes a mounting portion 1502 corresponding to a leg portion and a grounding portion 1504 corresponding to a head portion and integral with (or optionally couplable to and/or de-couplable from) the mounting portion 1502. The mounting portion 1502 is configured to be received and removably secured in the second cavity 264 of the cable fixation unit 202.

The grounding portion 1504 comprises, in some examples, an electrically conductive material and includes a grounding conductor platform 1506 and a strength member terminating area 1508. The strength member terminating area 1508 is a recessed platform partially surrounded by a wall 1510.

The strength member grounding unit 1500 also includes a cover 1520 comprising, in some examples, an electrically conductive material. The cover 1520 is removably couplable to the grounding portion 1504, e.g., with a screw 1560 that passes through the hole 1522 in the cover 1520 and the hole 1512 in the grounding portion 1504, the screw 1560 thus passing in between the two strength members 66 and not passing through the grounding conductor 208.

In some examples, the hole 1522 can extend through a boss 1524 that can nest or partially nest within the hole 1512, the screw 1560 being threadably engaged with the boss 1524. The cover 1520 includes a first portion 1530 and a second portion 1532 adjacent the first portion. The first portion 1530 can be configured to nest or partially nest within the recess defined by the wall 1510. When the strength member grounding unit 1500 is assembled, an underside 1536 of the cover 1520 abuts and secures the ends of the strength members 66 disposed in the strength member terminating area 1508.

When assembled, an underside 1542 of the second portion 1532 abuts a portion of the grounding conductor 208 disposed on the grounding conductor platform 1506. The grounding conductor 208 is also in contact with the strength members 66. Thus, when assembled, the strength members 66 and the grounding conductor 208 are securely and conductively sandwiched between the grounding conductor platform 1506 and the underside 1542 of the second portion 1532 of the cover 1520, such that the grounding conductor 208 and the strength members 66 are securely electrically coupled.

In some examples, one or more extensions 1538 from the underside 1542 of the second portion 1532 can hug portions of the mounting portion 1502 and/or the grounding portion 1504 to enhance the mechanical and/or electrical coupling of the cover 1520 thereto. In addition, the extensions 1538 can be spaced apart to define openings to one or more channels/passages 1540 through which the strength members 66 pass.

FIG. 19A is an isometric view of a portion the example strength member grounding unit 1500 of FIG. 17. FIG. 19B is a further isometric view of the portion of the example strength member grounding unit 1500 of FIG. 19A. FIG. 19C is a front view of the portion of the strength member grounding unit 1500 of FIG. 19A.

Referring to FIGS. 19A, 19B, and 19C (collectively, FIG. 19), as shown in this example the grounding conductor platform 1506 is stepped down or depressed relative to the strength member terminating area 1508. The height h of the step 1570 can be selected to correspond to or be slightly greater than a thickness of the grounding conductor 208 such that the strength members 66 pass smoothly over the grounding conductor and into the strength member terminating area 1508 while still contacting the grounding conductor 208 and, in some examples, also compressing the grounding conductor 208.

It should be appreciated that, because the strength members 66 make direct contact with the electrical conductor 208, portions or the entirety of the strength member grounding unit 1500 need not be made of an electrically conductive material. For example, one or both of the grounding conductor platform 1506 and the cover 1520 need not be electrically conductive and the strength members 66 would still be electrically grounded via the electrical conductor 208.

The strength member terminating area 1508 is defined by a surface 1572, which defines a plane X that is parallel to and/or coincident with a plane defined by the channels/passages 1540. The plane X extends into and out of the page in FIG. 19C through the line $A_5$. The plane X forms an angle α with the horizontal (defined by the line $A_4$). As discussed above with respect to the angle θ, the angle α is a non-zero angle typically between approximately 30° and 60°, such that the strength members 66 are affixed at an incline relative to the horizontal and the vertical. In the example shown in FIG. 19C, the angle α is approximately 45°.

Figure 20:
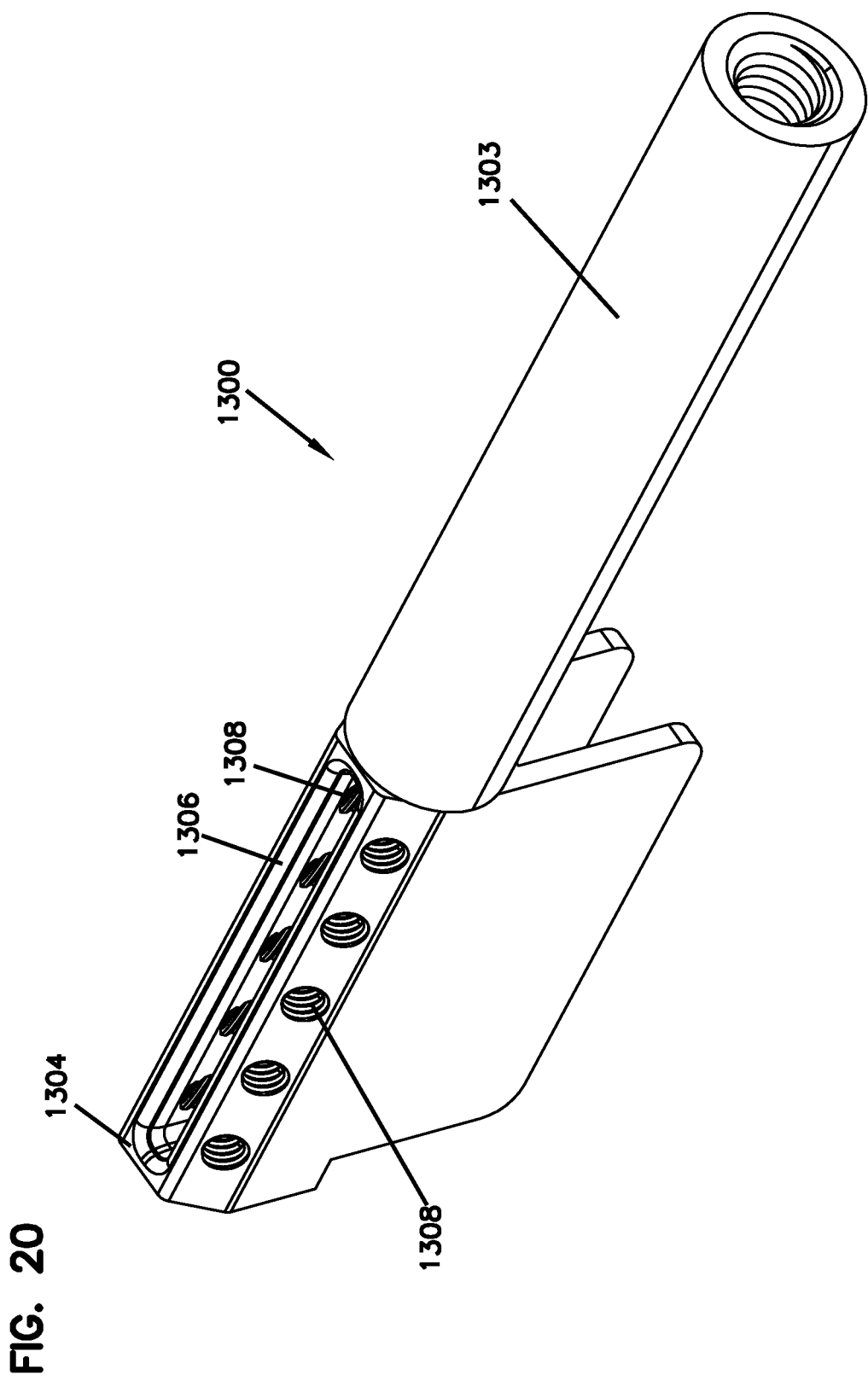
FIG. 20 is an isometric view of a further embodiment of a grounding bar in accordance with the present disclosure.
Figure 21:
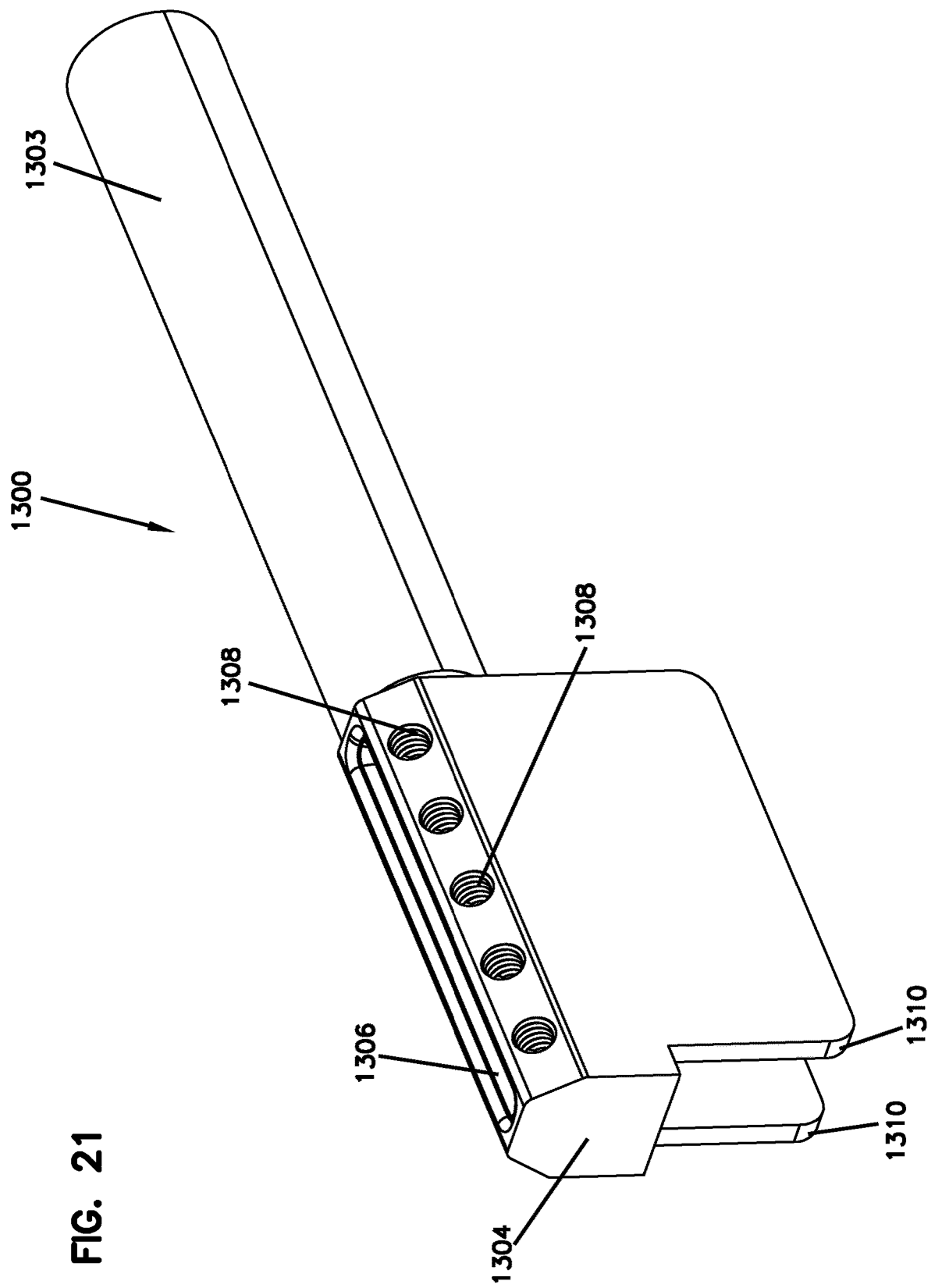
FIG. 21 is a further isometric view of the grounding bar of FIG. 20.

FIG. 20 is an isometric view of a further embodiment of a grounding bar 1300 in accordance with the present disclosure. FIG. 21 is a further isometric view of the grounding bar 1300 of FIG. 20.

Referring to FIGS. 20 and 21, the grounding bar 1300 is mountable in the tray 900 described above. The grounding bar 1300 includes a mounting portion 1304 and a stud 1303 removably coupled to the mounting portion 1304. A top opening slot 1306 can receive the grounding conductors 206 and 208, which can be secured therein at any of a plurality of axial positions defined by the holes 1308 on either side of the slot 1306. That the slot 1306 is open to a top side of the mounting portion 1304 can aid a technician in coupling of the grounding conductors 206 and 208 to the grounding bar 1300 due to, e.g., the accessibility of the slot 1306. Fasteners, such as set screws can be installed in the appropriate hole or holes 1308 to secure grounding conductors 206 and 208 in the slot 1306 and provide electrical connection between the grounding conductors 206 and 208 and the grounding bar 1300. Legs 1310 of the mounting portion 1304 can be inserted in a channel of the tray 900.

Figure 22:
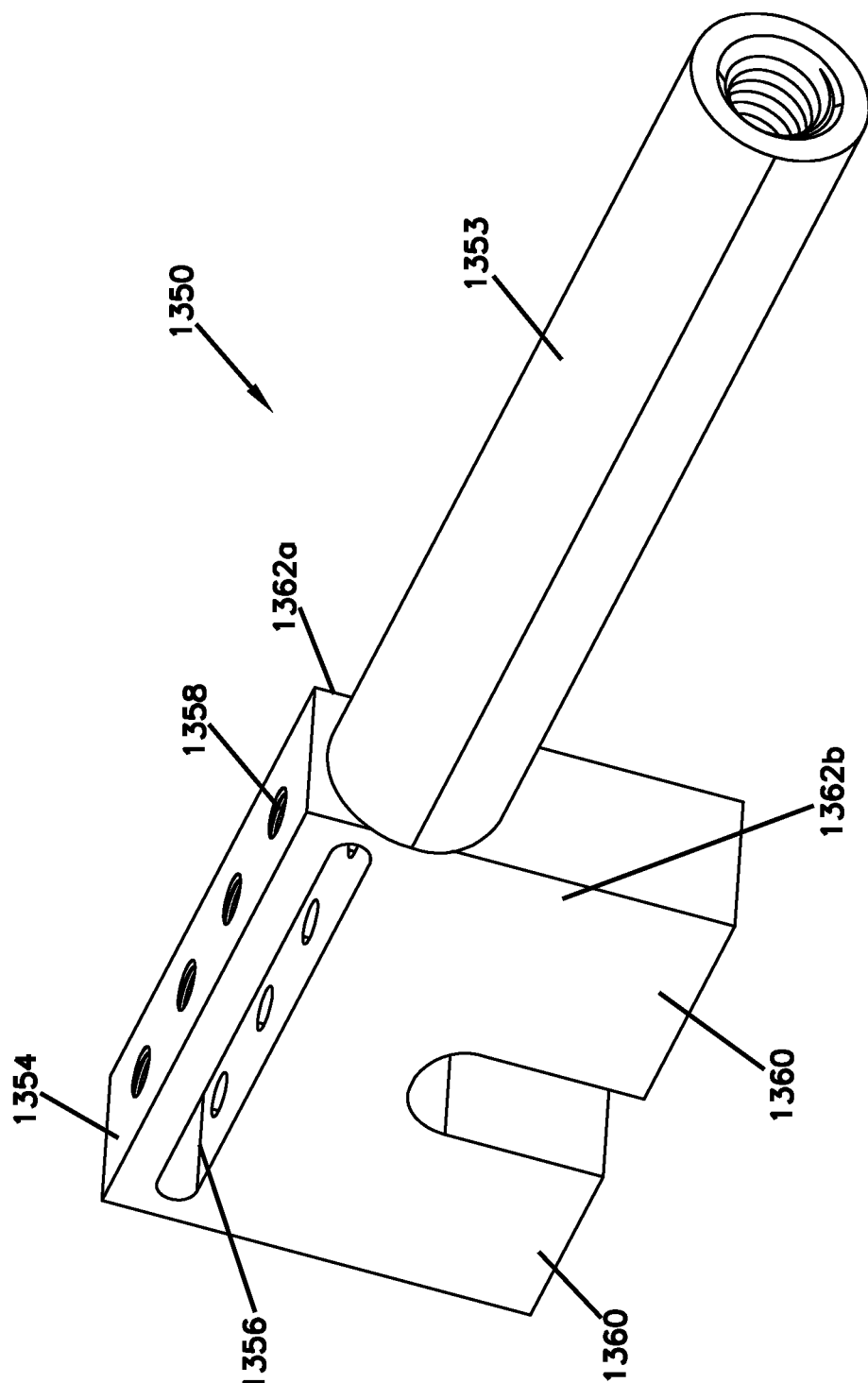
FIG. 22 is an isometric view of a further embodiment of a grounding bar in accordance with the present disclosure.
Figure 23:
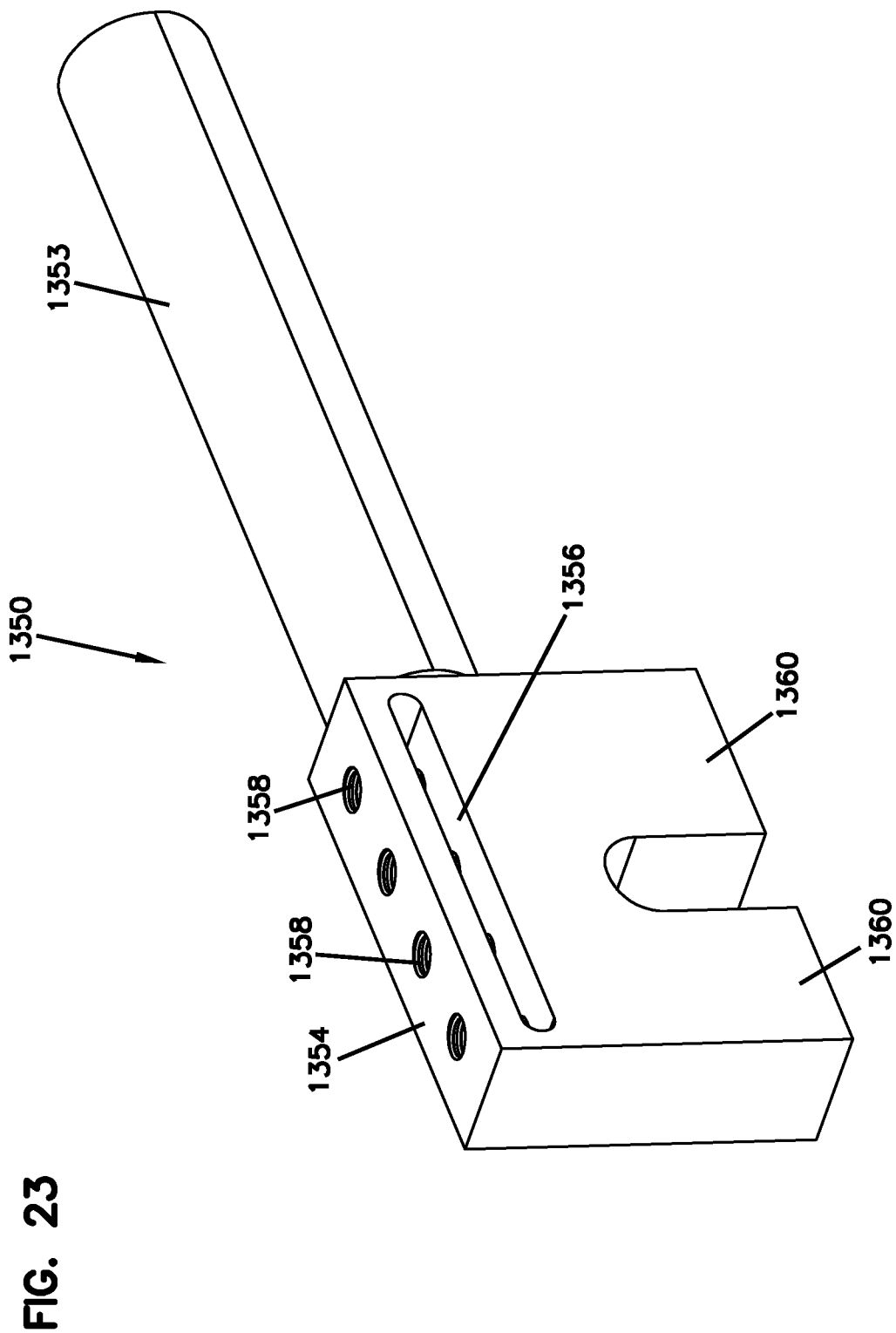
FIG. 23 is a further isometric view of the grounding bar of FIG. 22.

FIG. 22 is an isometric view of a further embodiment of a grounding bar 1350 in accordance with the present disclosure. FIG. 23 is a further isometric view of the grounding bar 1350 of FIG. 22.

Referring to FIGS. 22 and 23, the grounding bar 1350 is mountable in the tray 900 described above. The grounding bar 1350 includes a mounting portion 1354 and a stud 1353 removably coupled to the mounting portion 1354. A side opening slot 1356 (which, in some examples, is accessible from both sides 1362a and 1362b of the mounting portion 1354) can receive the grounding conductors 206 and 208, which can be secured therein at any of a plurality of axial positions defined by the holes 1358. Fasteners, such as set screws, can be installed in the appropriate hole or holes 1358 to secure grounding conductors 206 and 208 in the slot 1356 and provide electrical connection between the grounding conductors 206 and 208 and the grounding bar 1350. Legs 1360 of the mounting portion 1354 can be inserted in a channel of the tray 900.

Figure 24:
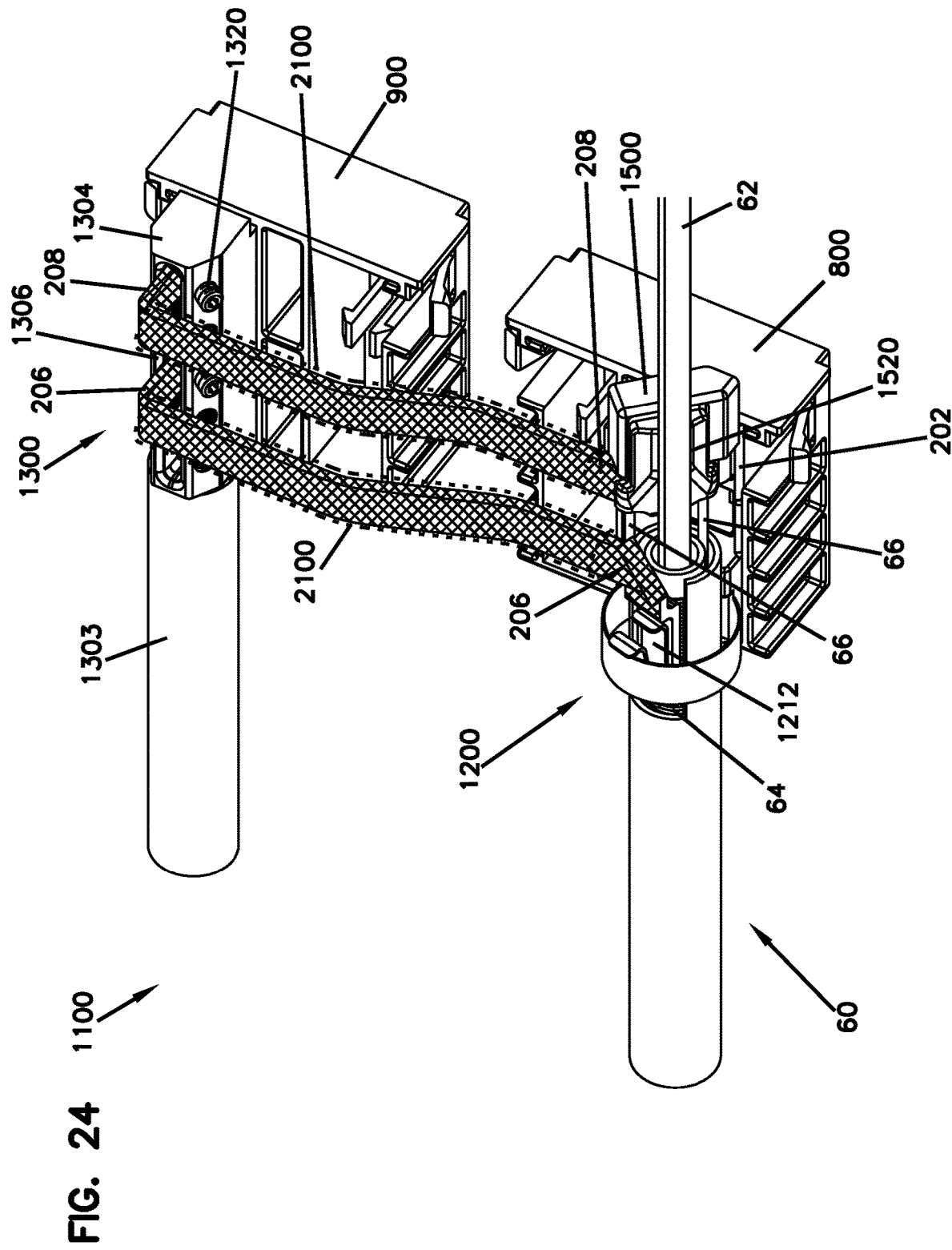
FIG. 24 is an isometric view of a further example cable grounding assembly for the cable of FIG. 3 in accordance with the present disclosure.

FIG. 24 is an isometric view of a further cable grounding assembly 1100 for the cable 60 in accordance with the present disclosure, the assembly 1100 including the subassembly 1200, the grounding bar 1300, the tray 800, and the tray 900. The grounding assembly 1100 can be used in a telecommunications enclosure to provide dual grounding paths to one or more cables entering the enclosure.

In this example, the grounding conductors 206 and 208 are secured in the slot 1306 of the grounding bar 1300 with set screws 1320 installed in selected holes 1308. The strength members 66 are secured in the strength member grounding unit 1500 and are electrically coupled to the grounding conductor 208. The fibers 62 pass above the cover 1520 for routing or other purposes within the enclosure. In addition, in this example, a portion of each of the grounding conductors 206 and 208 is protected by an insulating sleeve represented schematically by reference number 2100. The insulating sleeves 2100 can help to electrically isolate the two grounding conductors 206 and 208 from each other, and also to prevent harm to a technician.

Figure 25:
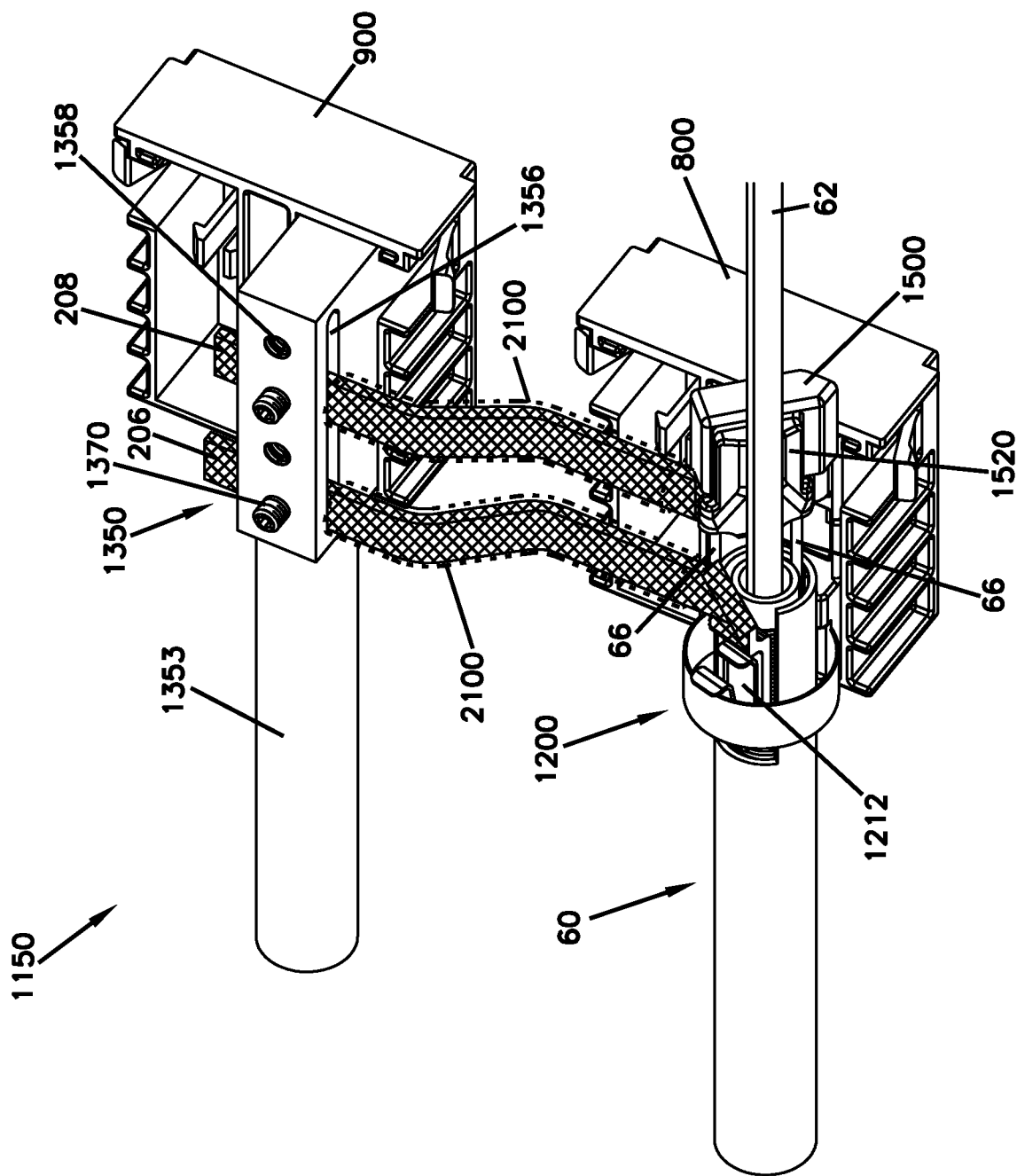
FIG. 25 is an isometric view of a further example cable grounding assembly for the cable of FIG. 3 in accordance with the present disclosure.

FIG. 25 is an isometric view of a further cable grounding assembly 1150 for the cable 60 in accordance with the present disclosure, the assembly 1150 including the subassembly 1200, the grounding bar 1350, the tray 800, and the tray 900. The grounding assembly 1150 can be used in a telecommunications enclosure to provide dual grounding paths to one or more cables entering the enclosure.

In this example, the grounding conductors 206 and 208 are secured in the slot 1356 of the grounding bar 1350 with set screws 1370 installed in selected holes 1358. The strength members 66 are secured in the strength member grounding unit 1500 and electrically coupled to the grounding conductor 208. The fibers 62 pass above the cover 1520 for routing or other purposes within the enclosure. In addition, in this example, a portion of each of the grounding conductors 206 and 208 is protected by an insulating sleeve represented schematically by reference number 2100. The insulating sleeves 2100 can help to electrically isolate the two grounding conductors 206 and 208 from each other, and also to prevent harm to a technician.

In an example method of assembling a cable grounding assembly in accordance with the present disclosure, one or more operations may be performed in the following sequence or a different sequence.

In one operation a portion of the jacket of an end part of a cable entering a telecommunications enclosure is stripped to expose a conductive shield.

In a further operation, the forward ends of the cable's axial strength members are inserted into a portion of a strength member grounding unit.

In a further operation, a first end of a first electrical conductor is coupled to the strength member grounding unit.

In a further operation, the forward ends of the strength members are secured to the strength member grounding unit and the strength members are electrically coupled, via the strength member grounding unit, to the first electrical conductor.

In a further operation, the strength member grounding unit is secured in a first cavity of a cable fixation unit.

In a further operation, an adjustable strap is placed around the cable, an end of a second grounding conductor is placed between the strap and the conductive shield of the cable, and an end of the strap is secured in a second cavity of the cable fixation unit to provide electrical coupling between the second grounding conductor and the electrical shield, and to affix the cable in a specific orientation relative to the cable fixation unit such that the strength members lie in a plane that is at a non-zero angle relative to a bottom surface of the cable fixation unit and/or at a non-zero angle relative to each of a vertical plane and a horizontal plane. In some examples, a biasing element is placed between the strap and the conductive shield of the cable to reduce the chances of the strap losing electrical contact with the conductive shield. In some examples, a toothed element is placed between the conductive shield and the second grounding conductor to provide an enhanced electrical contact between the conductive shield and the second grounding conductor.

In a further operation, the cable subassembly is mounted to a portion of the telecommunications enclosure.

In a further operation, the first and second grounding conductors are routed to a grounding bar assembly of the telecommunications enclosure and ends of the first and second grounding conductors are affixed to a grounding bar of the grounding bar assembly.

From the foregoing detailed description, it will be evident that modifications and variations can be made in the devices of the disclosure without departing from the spirit or scope of the invention.

What is claimed is:

1. A grounding assembly for a cable, the cable having an outer jacket defined by a central axis, at least one optical fiber, a conductive shield coaxial with the central axis, and at least one strength member extending parallel to the central axis and at least partially positioned between the central axis and the outer jacket, the grounding assembly comprising:
    a cable fixation unit for fixing the outer jacket of the cable;
    a strength member grounding unit;
    a first grounding conductor; and
    a second grounding conductor, the cable fixation unit having a first cavity and a second cavity, the first cavity removably receiving and securing opposing ends of a cable strap, the second cavity removably receiving and securing a mounting portion of the strength member grounding unit, the strength member grounding unit being adapted to receive the at least one strength member, the first grounding conductor being electrically coupled to the conductive shield and a grounding bar and extending therebetween, the second grounding conductor being electrically coupled to the strength member grounding unit and the grounding bar and extending therebetween.

2. The grounding assembly of claim 1, further comprising a biasing element at least partially disposed between the cable strap and the first grounding conductor.

3. The grounding assembly of claim 1, further comprising a toothed element, the toothed element being at least partially disposed between the conductive shield and the first grounding conductor.

4. The grounding assembly of claim 1, wherein the first grounding conductor and the second grounding conductor are braids.

5. The grounding assembly of claim 1, wherein the strength member grounding unit comprises a head portion, and wherein the mounting portion extends from the head portion to a bottom of the strength member grounding unit.

6. The grounding assembly of claim 5, wherein the first portion of the second grounding conductor is coupled to the head portion of the strength member grounding unit.

7. The grounding assembly of claim 6, wherein the strength member grounding unit comprises at least one passage that is in communication with a space defined by a recessed platform of the head portion of the strength member grounding unit, and wherein the recessed platform is at least partially surrounded by a wall of the head portion of the strength member grounding unit.

8. The grounding assembly as in claim 7, wherein the space is adapted to receive a fastener that secures the at least one strength member to the strength member grounding unit.

9. The grounding assembly of claim 1, wherein each of the second portions of the first and second grounding conductors are couplable at different positions to at least one slot or gap defined by the grounding bar.

10. A grounding assembly for a cable, the cable having an outer jacket defined by a central axis, at least one optical fiber, and two strength members, each of the two strength members being positioned between the central axis and the outer jacket and having a longitudinal axis parallel to the central axis of the cable, the longitudinal axes of the two strength members being on opposing sides of the cable, the grounding assembly comprising:
    a cable fixation unit for fixing the outer jacket, the cable fixation unit including a cavity and a bottom surface, the bottom surface defining a first plane;
    a strength member grounding unit, the strength member grounding unit comprising a mounting portion removably received by the cavity and a grounding portion integral with the mounting portion and having at least one receiving area for receiving the strength members, the at least one receiving area defining a second plane that is parallel to the longitudinal axes of the strength members;
    wherein when the mounting portion of the strength member grounding unit is received by the cavity, the first plane and the second plane are oblique to each other.

11. The grounding assembly of claim 10, wherein the first plane is positioned relative to the second plane at angle between about 30 degrees and about 60 degrees.

12. The grounding assembly of claim 11, wherein the first plane is positioned relative to the second plane at an angle of about 45 degrees.

13. A strength member grounding unit for a cable grounding assembly, the strength member grounding unit comprising a vertically oriented mounting portion, and a head portion integral with or coupled to the mounting portion, the head portion including a recessed platform at least partially surrounded by a wall, the recessed platform having a surface supporting at least one strength member of a cable, the surface defining a plane that is oblique to a vertical plane defined by the mounting portion, the strength member grounding unit further comprising a cover that is removably secured to the head portion and at least partially nests within the recessed platform.

14. The strength member grounding unit as in claim 13, wherein the cover comprises one or more extensions that partially define at least one opening for receiving the at least one strength member.

15. The strength member grounding unit of claim 13, wherein the head portion includes a grounding conductor platform, the grounding conductor platform being recessed relative to the recessed platform.

16. The strength member grounding unit as in claim 15, wherein the surface defines a hole positioned to be between two of the at least one cable strength member supported on the surface.

17. A grounding assembly for a cable, the cable having an outer jacket defined by a central axis, at least one optical fiber, and at least one strength member extending parallel to the central axis and at least partially positioned between the central axis and the outer jacket, the grounding assembly comprising:

a cable fixation unit for fixing the outer jacket of the cable;
a strength member grounding unit;
a first grounding conductor; and
a second grounding conductor;
wherein the cable fixation unit holds the strength member grounding unit; and
wherein the strength member grounding unit receives the at least one strength member such that the at least one strength member is in electrically conductive contact with the strength member grounding unit.

18. The grounding assembly of claim 17,
wherein the cable comprises a conductive shield coaxial with the central axis;
wherein the assembly further comprises a grounding bar;
wherein the first grounding conductor has a first portion electrically coupled to the conductive shield and a second portion electrically coupled to the grounding bar; and
wherein the second grounding conductor has a first portion electrically coupled to the strength member grounding unit and a second portion electrically coupled to the grounding bar.

* * * * *